US008531418B2

(12) United States Patent
Nolting et al.

(10) Patent No.: US 8,531,418 B2
(45) Date of Patent: Sep. 10, 2013

(54) TOUCH SENSOR HAVING IMPROVED EDGE RESPONSE

(75) Inventors: John Nolting, San Jose, CA (US); David Hann Jung, Fremont, CA (US)

(73) Assignee: Integrated Device Technology Inc, San Jose, CA (US)

(*) Notice: Subject to any disclaimer, the term of this patent is extended or adjusted under 35 U.S.C. 154(b) by 273 days.

(21) Appl. No.: 12/975,707

(22) Filed: Dec. 22, 2010

(65) Prior Publication Data
US 2012/0127118 A1 May 24, 2012

Related U.S. Application Data

(60) Provisional application No. 61/416,231, filed on Nov. 22, 2010.

(51) Int. Cl.
G06F 3/041 (2006.01)
(52) U.S. Cl.
USPC .......................... 345/173; 345/174; 178/18.01
(58) Field of Classification Search
USPC ................... 345/173–178; 178/18.01–18.09
See application file for complete search history.

(56) References Cited

U.S. PATENT DOCUMENTS

| | | | | |
|---|---|---|---|---|
| 8,159,467 B2* | 4/2012 | Gray et al. | | 345/173 |
| 8,274,486 B2* | 9/2012 | Barbier et al. | | 345/173 |
| 2006/0097991 A1 | 5/2006 | Hotelling et al. | | |
| 2006/0238517 A1* | 10/2006 | King et al. | | 345/173 |
| 2006/0284856 A1 | 12/2006 | Soss | | |
| 2007/0247443 A1* | 10/2007 | Philipp | | 345/173 |
| 2008/0252608 A1* | 10/2008 | Geaghan | | 345/173 |
| 2008/0259044 A1 | 10/2008 | Utsunomiya et al. | | |
| 2009/0153438 A1* | 6/2009 | Miller et al. | | 345/55 |
| 2010/0013774 A1 | 1/2010 | Chen et al. | | |
| 2010/0026656 A1* | 2/2010 | Hotelling et al. | | 345/174 |
| 2010/0045615 A1 | 2/2010 | Gray et al. | | |
| 2010/0079393 A1 | 4/2010 | Dews | | |
| 2010/0156810 A1 | 6/2010 | Barbier et al. | | |
| 2010/0259504 A1 | 10/2010 | Doi et al. | | |
| 2010/0295814 A1* | 11/2010 | Kent et al. | | 345/174 |
| 2011/0187678 A1* | 8/2011 | Salaverry et al. | | 345/175 |
| 2012/0127130 A1 | 5/2012 | Jung | | |
| 2012/0127131 A1 | 5/2012 | Jung et al. | | |

* cited by examiner

Primary Examiner — Bipin Shalwala
Assistant Examiner — Premal Patel
(74) Attorney, Agent, or Firm — Hayes and Boone LLP

(57) ABSTRACT

A sensor is provided. The sensor includes a planar sensing area including a sensor layout. The sensor layout includes an interior portion, an edge portion, and edges. The sensor layout also includes interior sensing elements, the interior sensing elements being located in the interior portion, and edge sensing elements, the edge sensing elements being located in the edge portion. The interior sensing elements are arranged in the sensor layout such that the interior sensing elements generally do not extend beyond a predetermined distance from the edges. Moreover, the edge sensing elements are arranged to extend beyond the predetermined distance and interlace with the interior sensing elements in the interior portion. The sensor further includes a controller and a connector, the connector coupling the planar sensing area to the controller.

18 Claims, 17 Drawing Sheets

TOUCH SENSOR HAVING IMPROVED EDGE RESPONSE

RELATED APPLICATIONS

This application claims priority to U.S. Provisional Application No. 61/416,231, filed on Nov. 22, 2010, which is hereby incorporated by reference in its entirety. Moreover, this application is related to U.S. patent application Ser. No. 12/975,666, filed on Dec. 22, 2010, entitled "Proportional Area Weighted Sensor for Two-Dimensional Locations on a Touch Screen," by David Hann Jung and U.S. patent application Ser. No. 12/975,687, filed on Dec. 22, 2010, entitled "Method to Improve Performance of a Proportional Area Weighted Sensor for Two-Dimensional Locations on a Touch Screen," by David Hann Jung and John Nolting. The contents of both of these applications are also hereby incorporated by reference in their entirety.

BACKGROUND

1. Technical Field

Embodiments disclosed herein relate to the field of touch sensors and, more specifically, to improving the response at the edges of the sensing area.

2. Description of Related Art

Modern electronic devices often have touch sensors to receive input data. There are a variety of types of touch sensor applications, such as touch sensors, digitizers, touch buttons, touch switches, touch scroll bars, and other similar devices.

Conventional touch sensors based on capacitive coupling use conductive plates typically made of Indium Tin Oxide (ITO) or some other transparent material that is electrically conductive. Several conductive elements separated by a dielectric may be placed in the plane of a sensor panel to detect the position of a touch. Typically, capacitive touch sensors require multiple layers of Indium Tin Oxide (ITO) to detect multiple touches. Some conventional touch sensors may use a single ITO layer, but they are not capable of determining the location of multiple simultaneous touches in more than a single direction due to the way the single ITO layer is disposed on the touch sensor. Moreover, touch sensors using a single ITO run into accuracy and precision issues for two-dimensional (2D) positioning. This typically occurs due to the conventional geometries used for the conductive elements in the ITO layer. There are conductive elements that produce more accurate 2D location by using new geometries. Examples of conductive elements using new geometries are shown in U.S. patent application Ser. No. 12/543,277, filed Aug. 18, 2009 and assigned to Integrated Device Technology, Inc., which is incorporated herein by reference in its entirety. These conductive elements using the new geometries result in a linear change of capacitance as a touch moves from one conductive element to an adjacent conductive element. While these conductive elements have been successful, there may be a loss of location accuracy at the edges of the sensor panel where linearity of the capacitance changes may fail. The accuracy is typically less in these areas because the conductive sensing elements are measuring only a half of a touch at edges, and only a quarter of a touch at the corners. However, accuracy at the edges and corners of the sensor panel is important as these areas may be used for common important functions such as scrolling or closing an application or file.

What is needed is a touch sensor that more accurately determines the position of touches on edges and corners of a touch-sensitive panel.

BRIEF SUMMARY

Consistent with some embodiments, a sensor is provided. The sensor includes a planar sensing area including a sensor layout. The sensor layout includes an interior portion, an edge portion, and edges. The sensor layout also includes interior sensing elements, the interior sensing elements being located in the interior portion, and edge sensing elements, the edge sensing elements being located in the edge portion. The interior sensing elements are arranged in the sensor layout such that the interior sensing elements generally do not extend beyond a predetermined distance from the edges. Moreover, the edge sensing elements are arranged to extend beyond the predetermined distance and interlace with the interior sensing elements in the interior portion. The sensor further includes a controller and a connector, the connector coupling the planar sensing area to the controller.

Consistent with some embodiments, there is also provided a capacitive touch sensor for determining a two-dimensional location of a user touch. The capacitive touch sensor includes a touch surface, the touch surface formed as a two-dimensional plane and including a sensor element layout. The sensor element layout includes an interior portion, an edge portion, and edges, interior sensing elements, the interior sensing elements being located in the interior portion, and edge sensing elements, the edge sensing elements being located at the edge portion, wherein the interior sensing elements are arranged in the sensor layout such that the interior sensing elements generally do not extend beyond a predetermined distance from the edges, and the edge sensing elements are arranged to extend beyond the predetermined distance and interlace with the interior sensing elements in the interior portion. The capacitive touch sensor further includes a controller and a connector, the connector coupling the touch surface to the controller.

Consistent with some embodiments, there is also provided a method of manufacturing a capacitive touch sensor having an improved response. The method includes dividing a touch area of the capacitive touch sensor into an interior area and an edge area, wherein the edge area comprises an area of the touch area that extends from edges of the touch area inwards by a predetermined distance, and the interior area is a remaining area of the touch area. The method also includes arranging edge sensor elements in the edge area in a pattern that covers the edge area and extends into the interior area while maintaining an edge sensor element width that varies non-monotonically from a center of the edge sensing element along two substantially perpendicular directions. And, the method includes arranging interior sensor elements in the interior area in a pattern of the touch surface that covers the interior area while maintaining an interior sensor element width that varies non-monotonically from a center of the interior sensing element along two substantially perpendicular directions such that the interior sensor elements generally do not extend into the edge area.

Consistent with some embodiments, there is further provided a capacitive touch sensor for determining a two-dimensional location of a user touch. The capacitive touch sensor includes a touch surface, the touch surface formed as a two-dimensional plane and including a sensor element layout having a plurality of sensor elements, the sensor element layout comprising an interior portion, an edge portion, and edges, wherein the plurality of sensor elements have widths that vary non-monotonically from a center of the sensor elements along two substantially perpendicular directions on the sensor layout, and centroid. The capacitive touch sensor further includes the edge portion covered by an enclosure such that sensor elements that overlap the interior portion and edge portion are partially covered by the enclosure, a controller, and a connector, the connector coupling the touch surface to the controller.

These and other embodiments will be described in further detail below, with reference to the following drawings.

BRIEF DESCRIPTION OF THE DRAWINGS

Wherever possible, the same reference numbers are used throughout the drawings to refer to the same or like elements.

DETAILED DESCRIPTION

Figure 1:
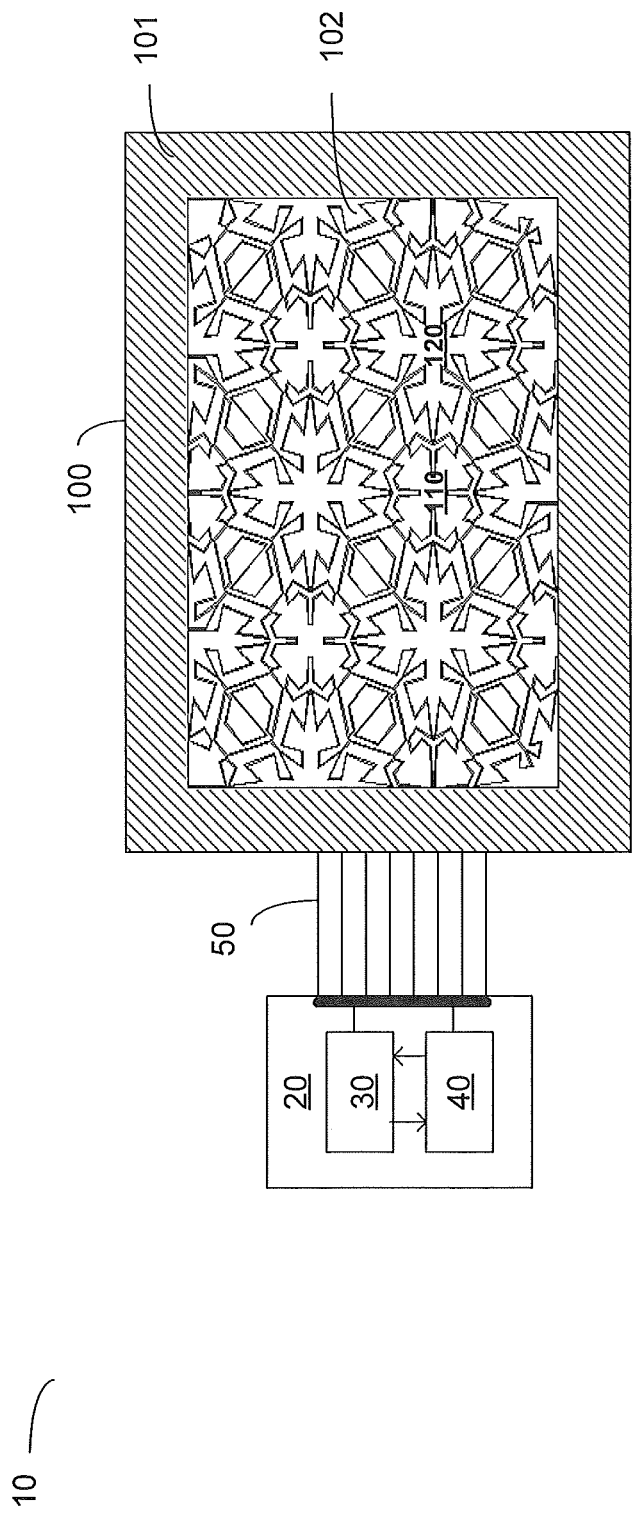
FIG. 1 shows a touch screen device for two dimensional locations according to some embodiments.

Touch sensors on screen panels may be of a variety of types, such as resistive, capacitive, and electro-magnetic types. A capacitive touch sensor is coated with a conductive material, typically Indium Tin Oxide (ITO), aluminum or copper, which conducts continuous electrical current across a sensor element. The sensor exhibits a precisely controlled field of stored charge in both the horizontal ('X') and vertical ('Y') axes of a display, to achieve capacitance. The human body is also an electrical device which has stored charge and therefore exhibits capacitance. When the sensor's normal capacitance field (its reference state) is altered by another capacitance field, e.g., by the touch or near touch (hereinafter, touches will also include near touches unless otherwise noted) of a person, capacitive touch sensors measure the resultant distortion in the characteristics of the reference field and send the information about the touch event to a touch controller for mathematical processing. There are a variety of types of capacitive touch controllers, including Sigma-Delta modulators (also known as capacitance-to-digital converters—CDCs–), charge transfer capacitive touch controllers, and relaxation oscillator capacitive touch controllers.

Touch screen sensing using single layer technology can achieve greater physical positional accuracy on either of two ways. One way is to increase the number of sensor elements which results in a reduction of their size. This approach may be expensive to implement due to the higher pin count required of the touch controller. Furthermore, there are physical limitations imposed on the number of wire connections or 'leads' that may be driven into each sensing element from the edges of the panel. For example, there may be a limitation on how narrow a conducting wire on a glass or other dielectric surface may be, before conductivity is affected. This becomes especially taxing if the intention is to obtain a touch screen panel using a single conductive layer.

Another approach may be to optimize the shapes of the sensor elements such that better location accuracy may be obtained by using fewer elements. By choosing an appropriate shape, elements occupying areas away from the edges of the screen panel may also have portions close to the edges. Thus, the number and length of leads stretching from the edge of the screen panel to its interior portions may be reduced. One strategy to further optimize the placement of leads to sensor elements is the use of pass-through traces and jumpers. In this strategy, an element may be split into two pieces so that a pass-through trace reaching an element further in the interior of the panel may be placed in between the two pieces. The two pieces, which may be disconnected in the screen panel, may then be connected via a jumper in the circuitry outside of the active area of the sensor layout.

In embodiments disclosed herein, a proportionally weighted area of sensor elements is used for determining location in two dimensions. According to some embodiments, a linear relation may apply between the change in capacitance of a touched sensor element and the area of the touch in the sensor element. By measuring the change in capacitance, the area of the touch overlapping a sensing element may be compared with the area overlapping other sensing elements. The ratio of the area overlap with each element to the total touch area may be calculated to form an overlap proportion. The overlap proportion may have a relation to the position of the center of the touch event relative to the center of each overlap element. In some embodiments this relation may be linear.

The performance of a capacitive touch screen consistent with embodiments disclosed herein may depend on the size of the touch area contacting the screen. In fact, some embodiments may have a layout of sensing elements which is optimized for operation with a specific touch area. For example, some embodiments may function with higher 2D location accuracy for a round touch having 2 mm in diameter. While embodiments consistent with this disclosure may also operate for circular touches ranging in diameter from 2 mm to 18 mm, some embodiments may be optimized for touches having a 12 mm diameter. The suitable touch diameters for various embodiments may vary outside this range depending on the number of sensors and the size of the touch screen, or the needs of the application. The touch may be a contact with a human finger, or a suitable device providing a capacitive contact to the sensing elements, such as a stylus.

Embodiments described herein may be used in single layer capacitive touch screen technology. Other technologies using proportionally weighted area sensor elements for 2D location may also use embodiments as disclosed herein.

FIG. 1 shows touch screen device 10 for providing two-dimensional touch locations according to some embodiments. Touch screen device 10 may include a touch controller 20 having a processor circuit 30 and a memory circuit 40. Controller 20 is coupled to a touch screen layout 100 through connector 50. Touch screen layout 100 is the touch surface for a user using touch screen device 10. Consistent with some embodiments, a user touches the touch surface of touch screen layout 100, and a two-dimensional location of the user touch will be determined by touch controller 20. Screen layout 100 may include sensing elements 110 and 120 covering the entire area of layout 100, without overlapping each other. Connector 50 may be a flex cable including a wire connector for each of the sensing elements 110 and 120 included in layout 100. In some embodiments, layout 100 may include an edge portion 101, and an interior portion 102. Interior portion 102 may be completely covered by elements 110 and 120, and may include at least one entire piece of at least one element 110 or 120. Edge portion 101 may also be covered by non-overlapping sensing elements. Sensing elements in edge portion 101 may include at least fragments of elements 110 and 120 which are not overlapping each other. Edge portion 101 is also coupled electrically to controller 20 through connector 50. In some embodiments consistent with FIG. 1, portion 101 may have non-overlapping sensing elements that have different shapes from portions or fragments of elements 110 or 120.

Figure 2:
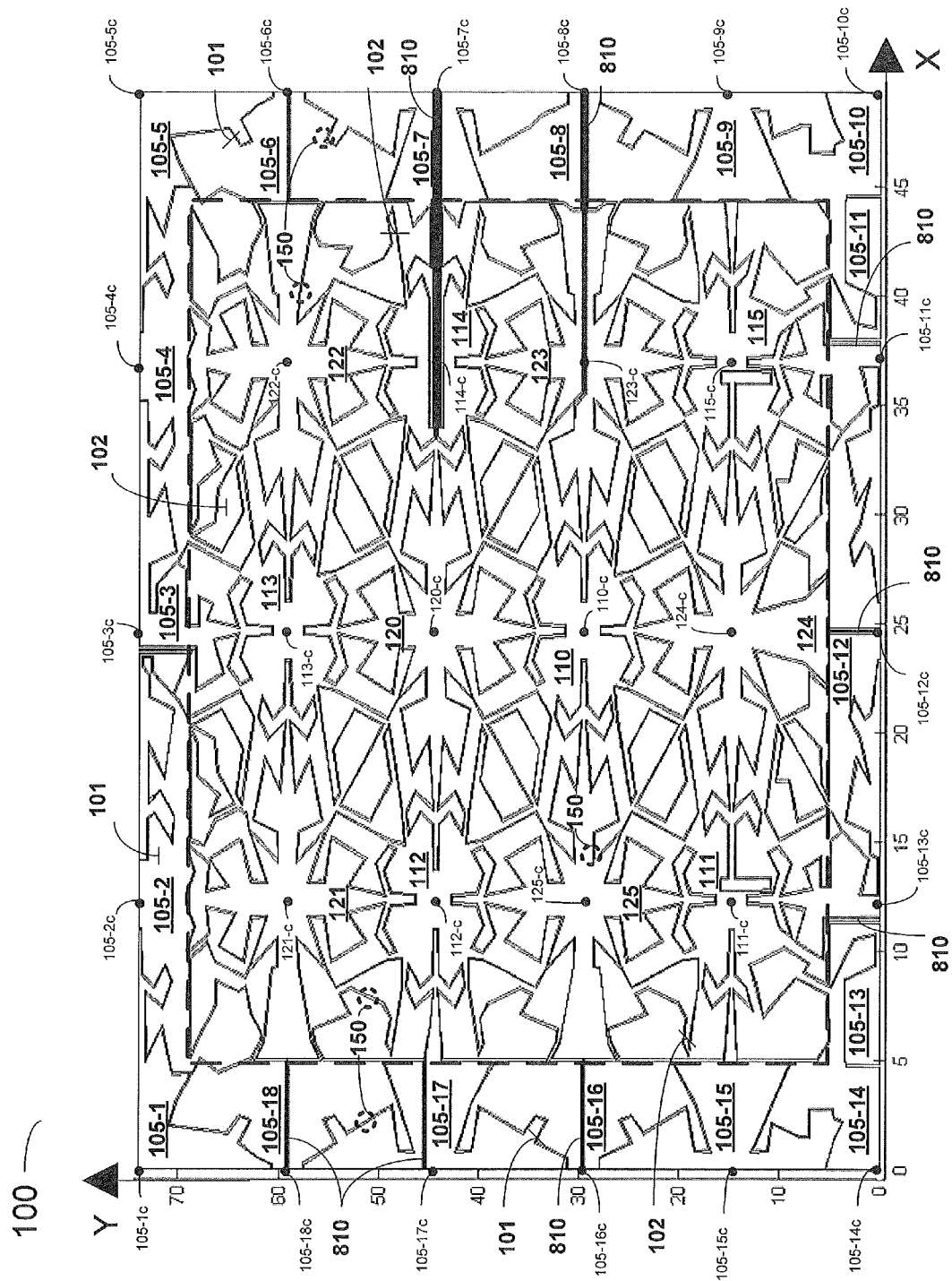
FIG. 2 shows a touch screen layout of conductive sensor elements for a single layer touch screen, according to some embodiments.

FIG. 2 shows touch screen layout 100 of conductive sensor elements for a single layer touch screen, according to some embodiments. According to FIG. 2, two basic designs may be used for sensing elements 110 and 120. The two designs 110 and 120 may complement each other, as shown in FIG. 2. In addition, interior portion 102 of layout 100 may include interior sensing elements 111-115 and interior sensing elements 121-125. Elements 111-115 may be partially similar to element 110, and elements 121-125 may be partially similar to element 120. Edge portion 101 may also include edge sensing elements 105-1 to 105-18. According to some embodiments such as illustrated in FIG. 2, elements 105-1 to 105-18 may complement each other so that the entire area of portion 101 is covered by sensing elements. Some of sensing elements 105-1 to 105-18 may contain portions similar to the design of element 110 or element 120. Some sensing elements 105-1 to 105-18 may be different to element 110 and element 120, and also to each other, according to some embodiments. Furthermore, in some embodiments, elements 105-1 to 105-18 may be partially included inside portion 102. For example, elements 105-2, 105-4, 105-6, 105-7, 105-8, 105-9, 105-10, 105-11, 105-12, 105-13, 105-14, 105-15, and 105-17 may have some area included in portion 102.

Sensing elements 110-115, 120-125, and 105-1 to 105-18 are interlaced so that they may fill a 2D plane, of which layout 100 is a rectangular piece. Sensing elements 110-115, 120-125, and 105-1 to 105-18 are made of a conductive material, such as ITO, and may be deposited on a dielectric plate forming the background of layout 100. Each of sensing elements 110-115, 120-125, and 105-1 to 105-18 may thus be separated from all neighbors by a gap 150 of dielectric material. Thus, the capacitive effect of each sensing element in layout 100 may be decoupled from one another. Furthermore, sensing elements 110-115, 120-125, and 105-1 to 105-18 may form a first terminal of a capacitor coupled to controller 20 (cf. FIG. 1). A second terminal of the capacitor may be a finger or a capacitive element making contact with the sensing element by overlapping it. The capacitor thus formed between each of sensing elements and the touch element may be coupled to controller 20. The coupling may be realized using pass-through terminals 810 connecting sensing elements 110-115, 120-125, and 105-1 to 105-18 with controller 20 through connector 50 (cf. FIG. 1). The patterns and shapes shown in FIG. 2 are not limiting, other designs consistent with the layout and proportionality of sensing elements to a touch depicted in FIG. 2 may be used.

In FIG. 2 sensing elements 110-115 have centroids 110c-115c; sensing elements 120-125 have centroids 120c-125c; and sensing elements 105-1 to 105-18 have centroids 105-1c to 105-18c. While sensing elements 110 and 120 may be completely embedded in portion 102, elements such as 111 to 115 and 120 to 125 may have edge portions trimmed or altered from the original shape of elements 110 and 120, as illustrated in FIG. 2. For example, in some embodiments element 125 may be identical to element 120 except for the left arm, bottom arm and pass-through trace. Likewise, element 115 may be identical to element 110, except that the left, right and bottom portions may be altered in shape to improve accuracy and so that element 115 may be almost entirely included interior portion 102.

For elements 110 and 120, centroids 110c and 120c correspond to the true geometric center of the element. Some embodiments consistent with FIG. 2 may be such that centroids 111c to 115c and 121c to 125c are placed on the centroids of the untrimmed or unaltered sensing elements. For elements 105-1 to 105-18 included in edge portion 101, centroids 105-1c to 105-18c may be placed along the outer edge of layout 100 as illustrated in FIG. 2. Centroids 105-1c to 105-18c may not correspond to the geometric center of elements 105-1 to 105-18. Additional mathematical adjustments may be applied to the location of the centroids to achieve better accuracy. The positions of centroids 110c-115c, 120c-125c, and 105-1c to 105-18c may be stored in memory circuit 40 of controller circuit 20.

According to FIG. 2, an 'X-Y' coordinate system may be oriented along the horizontal-vertical edges of layout 100. The unit of measure for the markings in coordinate system 'X-Y' may be mm (millimeters). Embodiments of layout 100 consistent with FIG. 2 may include a number of sensing elements varying according to the size of the touch screen being used. Some embodiments may include layout 100 for a 2"×3.5" screen having 42 pieces corresponding to 30 sensing elements. The number of pieces may be larger than the number of sensing elements because a pass-thru trace may split a sensor element in two pieces. Each of the two pieces may be part of the same sensing element, coupled together in edge portion 101. However on layout 100, the two pieces may appear disconnected. The center of elements 110 and 120 may be located with a different pitch on the X-axis from that of the Y-axis. The X-axis and Y-axis are referred in the directions shown in FIG. 2. For example, in the embodiments depicted in FIG. 2 the X-axis pitch may be 12.3 mm and the Y-axis pitch may be 14.78 mm.

In embodiments consistent with FIG. 2 elements 110-115, and 120-125 occupy a substantial area of portion 102 and have portions near edge portion 101. This allows in some embodiments to have relatively short pass-through traces 810 coupling sensing elements 110-115 and 120-125 in interior portion 102. The intricate pattern of elements 110-115, 120-125, and 105-1 to 105-18 is such that wide area portions may be adjacent to narrow area portions in each element along the 'X' and 'Y' directions. Thus, the width of the element may change non-monotonically along X and Y directions, from the center of the element. Furthermore, elements 110-115, 120-125, and 105-1 to 105-18 are such that when placed next to each other there may be a continuous gap 150 between each element at every point along adjacent edges. According to embodiments as depicted in FIG. 2, gap 150 may be the same at every point along adjacent edges. Furthermore, elements 110-115 may be placed adjacent to one another and also form a continuous gap 150 between their edges. While element 110 may be adjacent to any of elements 110-115, and also an element 120, element 120 may be adjacent to elements 110-115 only. For example, element 110 in FIG. 2 may be adjacent to elements 120, 123-125, and 111, 112, 114 and 115. Element 120 in FIG. 2 may be adjacent to elements 110, 112, 113 and 114, only.

Embodiments of layout 100 consistent with FIG. 2 may include elements 110-115, 120-125, and 105-1 to 105-18 being substantially interlaced. This means that for all or mostly all sensing elements included in layout 100, it is true that for at least two points A and B inside an element, the line joining points A and B may not be completely contained within that element. Furthermore, interlaced elements 110-115 and 120-125 in layout 100 are such that there is at least one point C inside the element for which a straight line joining point C with the centroid of the element crosses over a neighboring element at least once.

Figure 3:
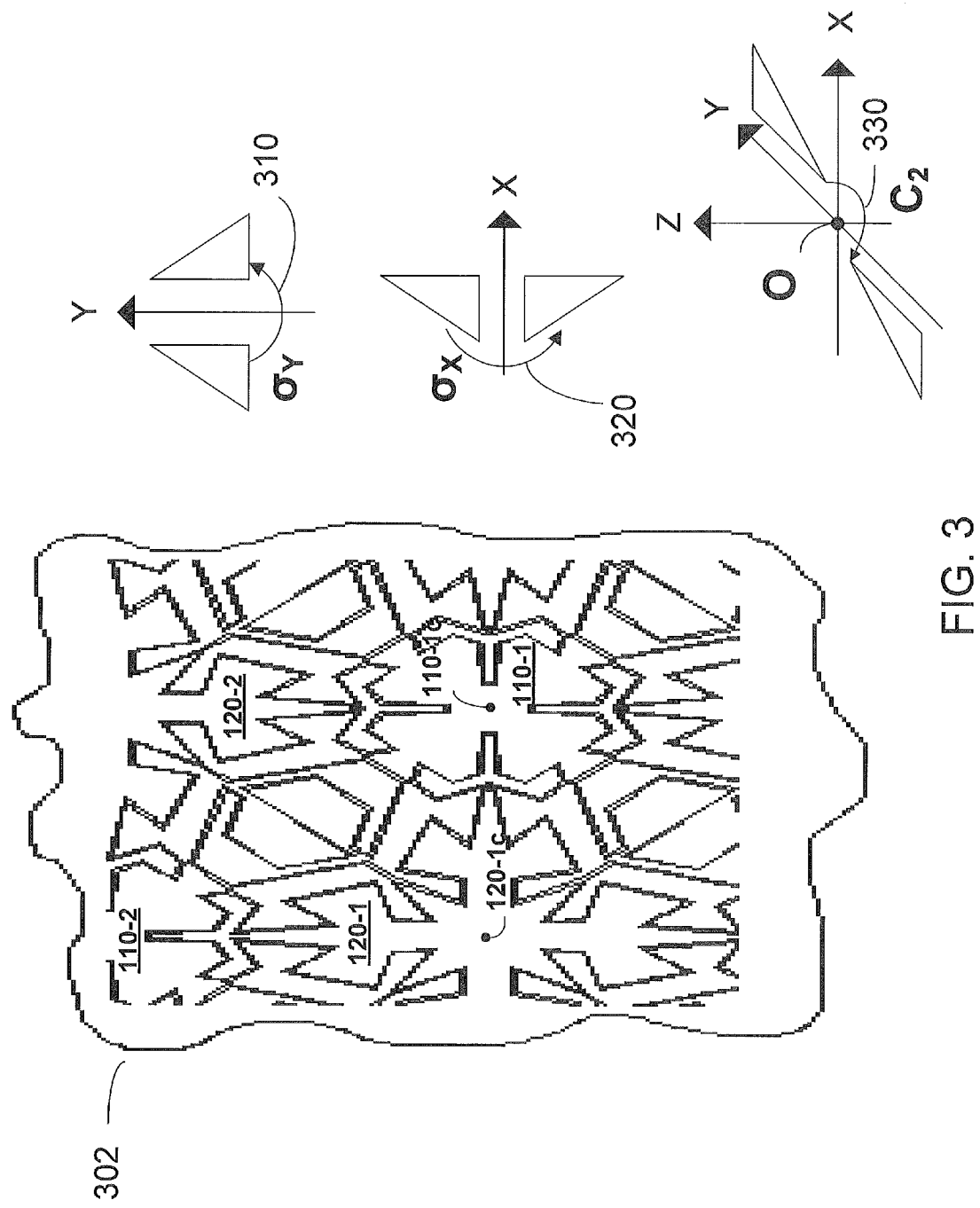
FIG. 3 shows a cut away of the layout in FIG. 2, illustrating layout symmetries, according to some embodiments.

FIG. 3 shows a cut away of inner portion 302 in layout 100 according to embodiments consistent with FIG. 2. Portion 302 in FIG. 3 may include elements 110-1 and 110-2, and elements 120-1 and 120-2. Elements 110-1 and 110-2 have the shape of element 110 in FIG. 2, and elements 120-1 and 120-2 have the shape of element 120 in FIG. 2. FIG. 3 illustrates the symmetries of sensing elements 110 and 120, according to some embodiments. The symmetry is based on the shape of elements 110 and 120 without including pass-through traces 810. Symmetry 310 ($\sigma_y$) is a mirror reflection about the Y-axis on the plane of layout 100. Symmetry 320 ($\sigma_x$) is a mirror reflection about the X-axis on the plane of layout 100. Symmetry 330 ($C_2$) is a rotation by 180° about the Z-axis, perpendicular to the plane of layout 100. According to FIG. 3, it is seen that patterns 110 and 120 forming layout 100 are invariant under operations $\sigma_y$ 310, $\sigma_x$ 320, and $C_2$ 330. As a result, portion 302 formed by placing patterns 110 and 120 adjacent to one another may also be invariant under operations $\sigma_y$ 310, $\sigma_x$ 320, and $C_2$ 330. Note that symmetries 310, 320, and 330 are defined in terms of the 'X-Y' coordinate system illustrated in FIG. 3. The coordinate origin O may be placed on centroid 110-1c for element 110-1, or on centroid 120-1c for element 120-1. In some embodiments consistent with FIG. 3, symmetry axes 'X' and 'Y' may be chosen parallel to the edges of layout 100. Symmetry operations $\sigma_x$, $\sigma_y$, and $C_2$ together with the identity operation, E, form a group, called the dihedral group, $D_2$. Discrete point symmetry groups of a 2D plane may include a $D_2$ symmetry group.

By comparing FIGS. 2 and 3 it is seen that sensing elements 110 and 120 in FIG. 2 may include symmetries 310, 320, and 330 about centroids 110c and 120c, respectively. Not all sensing elements in layout 100 may include these symmetries. Moreover, embodiments of layout 100 such as illustrated in FIG. 2 may include more symmetric elements in interior portion 102 than in edge portion 101. In fact, some embodiments may have elements 110 and 120 including symmetries 310, 320 and 330 in portion 102, and elements 105-1 to 105-18 including none of the symmetries 310, 320 and 330, in portion 101. Furthermore, while elements 110 and 120 in portion 102 may contain symmetries 310, 320 and 330, other elements in portion 102 may not. For example, element 125 in FIG. 2 includes symmetry 320 but not symmetry 310 nor 330. Also, some embodiments consistent with FIG. 2 may include elements having shapes that satisfy any one of the symmetries 310, 320 and 330 at least approximately. For example, element 122 in FIG. 2 may not satisfy symmetry 320 exactly, but it satisfies the symmetry approximately. Thus, overlapping element 122 in FIG. 2 with its mirror image upon symmetry 320 may cover a substantial portion of the area of element 122. This overlapping portion may be 90% or more.

Note that embodiments of layout 100 such as illustrated in FIGS. 2 and 3 may have an aspect ratio different from one (1) between the 'X' and 'Y' dimensions (X-Y aspect ratio). For example, in FIGS. 2 and 3 the diameter of elements 110 and 120 through their centroids may be smaller in a direction parallel to the X-axis than in a direction parallel to the Y-axis. This configuration relaxes the symmetry restrictions on layout 100, and may be chosen for screen geometries appropriate for a given application. For example, a palm-based device may use an X-Y aspect ratio smaller than one (1), with the 'X' and 'Y' axes as shown in FIG. 2. Other desktop- and laptop-based devices may use an X-Y aspect ratio larger than one (1). Some embodiments may use layout 100 having an X-Y aspect ratio of one (1). Further, embodiments of layout 100 such as illustrated in FIGS. 2 and 3 may have "shapes" and "patterns" created by the sensor elements that differ from those shown in FIGS. 2 and 3.

Figure 4:
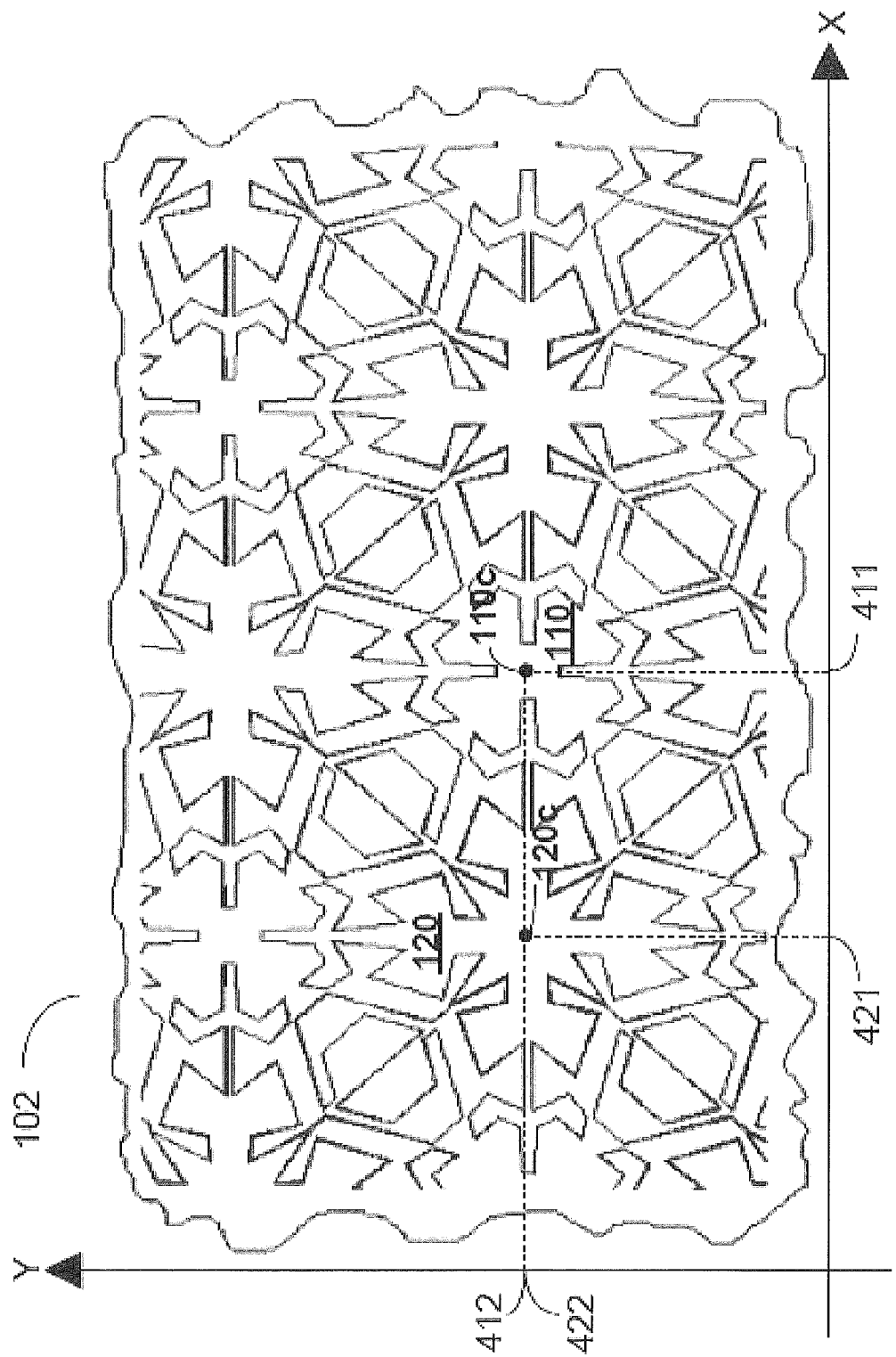
FIG. 4 shows a cut away of the layout in FIG. 2, illustrating the centroids of the sensor elements, according to some embodiments.

FIG. 4 shows a cut away of layout 100 illustrating centroids 110c and 120c of elements 110 and 120, respectively. Centroid 110c of element 110 has X-coordinate 411 and Y-coordinate 412. Centroid 120c of element 120 has X-coordinate 421 and Y-coordinate 422.

Figure 5:
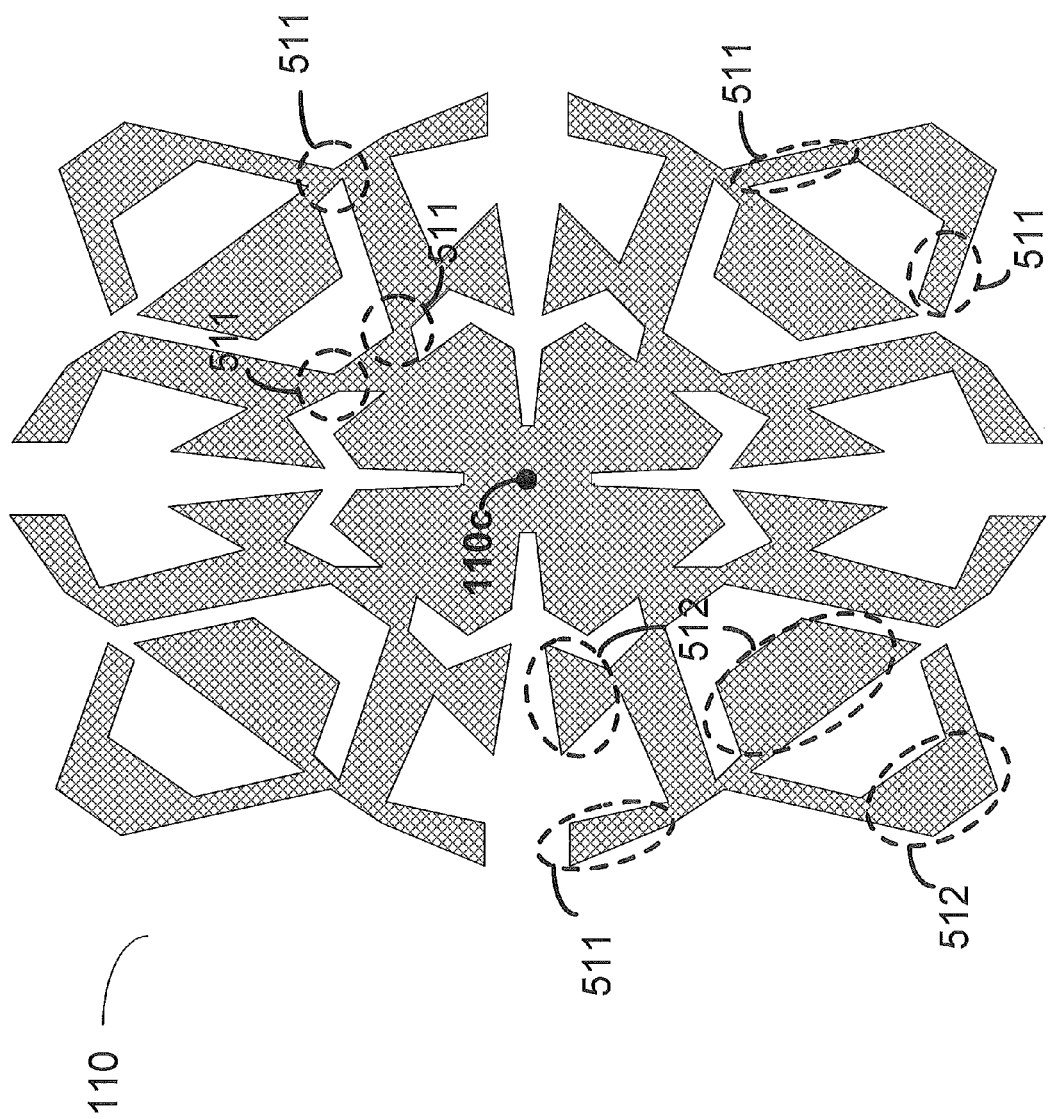
FIG. 5 shows a sensor element used in the layout of FIG. 2 having the symmetry shown in FIG. 3, according to some embodiments.

FIG. 5 shows sensor element 110 used in layout 100 having symmetries 310, 320, and 330 (FIG. 3) about centroid 110c, according to some embodiments. Element 110 in FIG. 5 may include narrow area portions 511 next to wide area portions 512. According to the embodiment depicted in FIG. 5, area portions 511 and 512 may be placed such that as a touch area is moved across element 110 in a direction away from centroid 110c, narrow area portions 511 and wide area portions 512 are encountered. Thus, the overlap proportion for element 110 may not vary monotonically as a touch area is moved across element 110. For example, if a touch area is centered on point 110c and moves along a direction forming 45° with the X-axis, the overlap proportion may decrease first, then increase, then decrease, increase again, and finally decrease down to zero as the touch area leaves the perimeter of element 110. The behavior of an overlap proportion may be different for touch areas moving in different directions and not passing through centroid 110c. Embodiments consistent with FIG. 5 are such that a non-monotonic variation of the overlap proportion results for touch areas moving substantially in any direction on the plane including layout 100.

Figure 6:
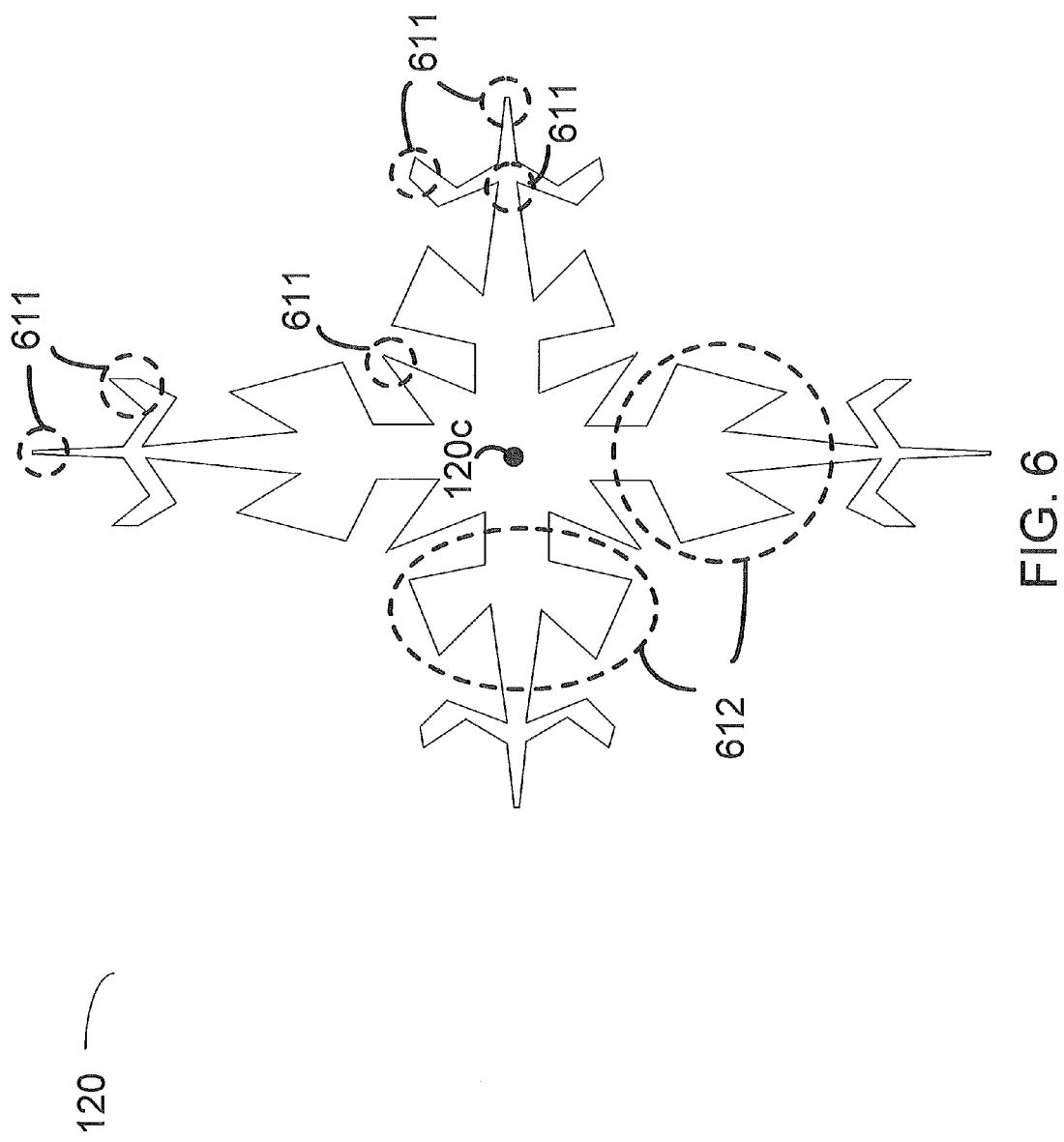
FIG. 6 shows a sensor element used in the layout of FIG. 2 having the symmetry shown in FIG. 3, according to some embodiments.

FIG. 6 shows sensor element 120 used in layout 100 having symmetries 310, 320, and 330 about centroid 120c (FIG. 3), according to some embodiments. Element 120 in FIG. 6 may include narrow and sharp area portions 611 next to wide area portions 612. According to the embodiment depicted in FIG. 6, area portions 611 and 612 may be placed such that as a touch area is moved across element 120 in a direction away from centroid 120c, narrow and sharp area portions 611 and wide area portions 612 are encountered. Thus, the overlap proportion for element 120 may not vary monotonically as a touch area is moved across element 120. For example, if a touch area is centered on point 120c and moves along a direction parallel to the X-axis the overlap proportion may decrease first, then increase, then decrease, increase again, and finally decrease down to zero as the touch area leaves the perimeter of element 120. The behavior of an overlap proportion may be different for touch areas moving in different directions and not passing through centroid 120c. Embodiments consistent with FIG. 6 are such that a non-monotonic variation of the overlap proportion results for touch areas moving substantially in any direction, on the plane including layout 100.

In embodiments consistent with FIGS. 5 and 6 narrow portions 511 and 611 may include sharp edges and narrow troughs formed of a conductive material such as ITO. Physical limitations may apply as to how narrow these elements may be, before conductivity throughout elements 110 and 120 may be affected. Also, there may be technical limitations to form elements 110 and 120 in a narrow shape having a sharp angle profile. For example, if an ITO layer is being deposited on a glass surface via sputtering, there may be resolution limitations imposed by the sputtering technique used. Thus, some embodiments may have rounded edges instead of sharp tips or "gulfs," in portions 511, 512, 611 or 612.

Figure 7:
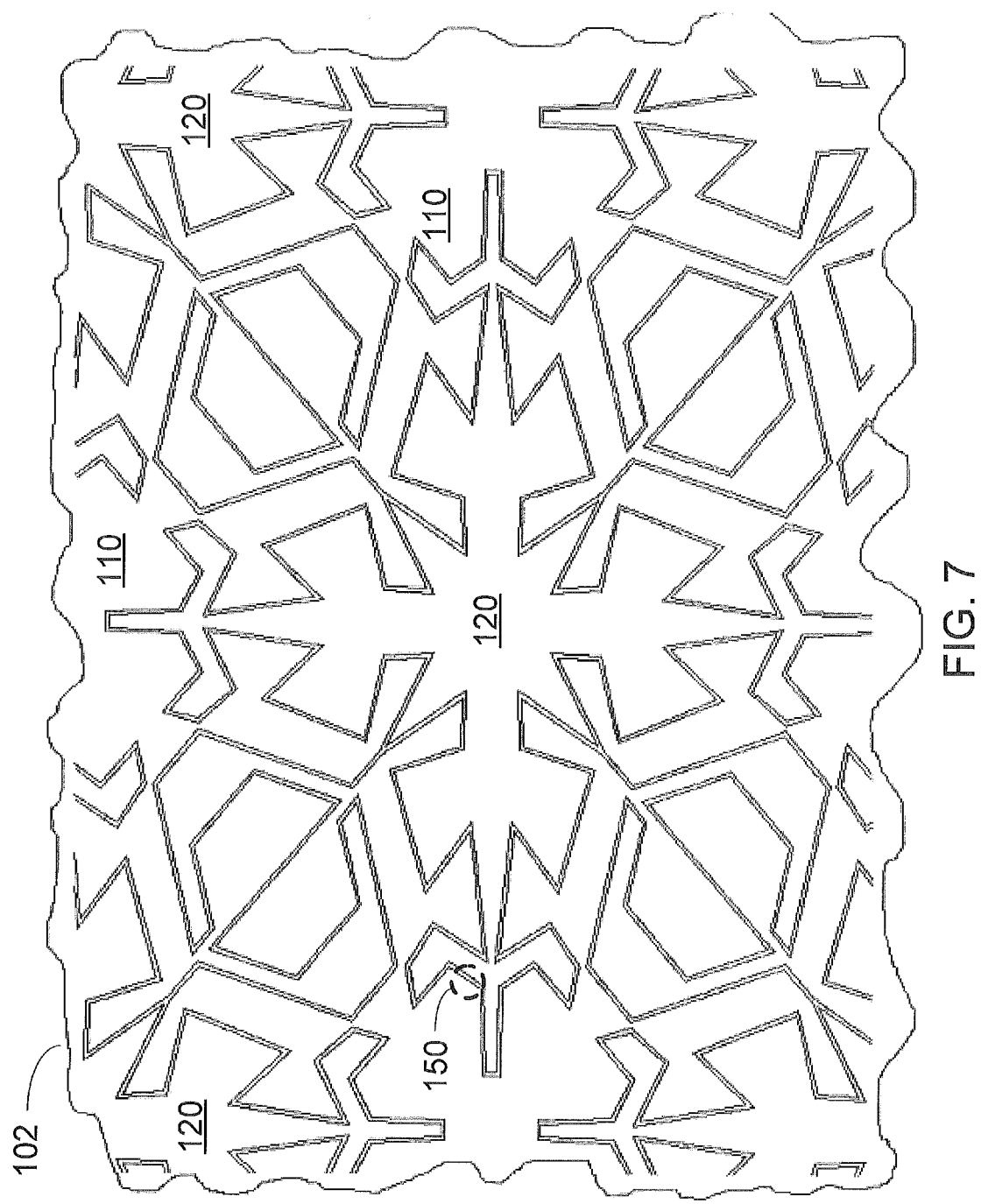
FIG. 7 shows a layout of conductive sensor elements for a single layer touch screen as in FIG. 2, wherein elements are separated from each other by a minimum gap, according to some embodiments.

FIG. 7 shows interior portion 102 for a single layer touch screen, wherein elements 110 and 120 are separated from each other by minimum gap 150, according to some embodiments. It may be desirable to have gap 150 be equal at every point on the edges of elements 110 and 120. Furthermore, it may be desirable for gap 150 to be as narrow as possible, so that the total area covered by gap 150 in layout 100 is minimal as compared to the area of sensing elements 110 and 120. In some embodiments, gap 150 may be chosen as minimal in comparison to the touch area for the sensor.

Given the material and the techniques of forming sensing elements 110 and 120, there may be physical limitations as to how narrow gap 150 may be. For example, according to sputtering techniques for ITO on glass, gap 150 may be as narrow as a few hundred μm's (1 μm=$10^{-6}$ m), or even 100 μm. Some embodiments may use other techniques and different conductive materials to form sensing elements 110 and 120, resulting in different values for gap 150. Other factors that may affect the thickness of gap 150 may be the capacitive coupling between sensing elements 110 and 120. In some embodiments it may be desirable to reduce the capacitive coupling between each of sensing elements forming layout 100. That is, it may be desirable to have sensing elements whose capacitance is completely independent from each other. In general, the narrower gap 150 is, the larger the coupling between adjacent elements in layout 100 may become. Capacitive coupling between adjacent sensing elements 110 and 120 may also be determined by the dielectric properties of the material on which the elements are deposited.

Figure 8:
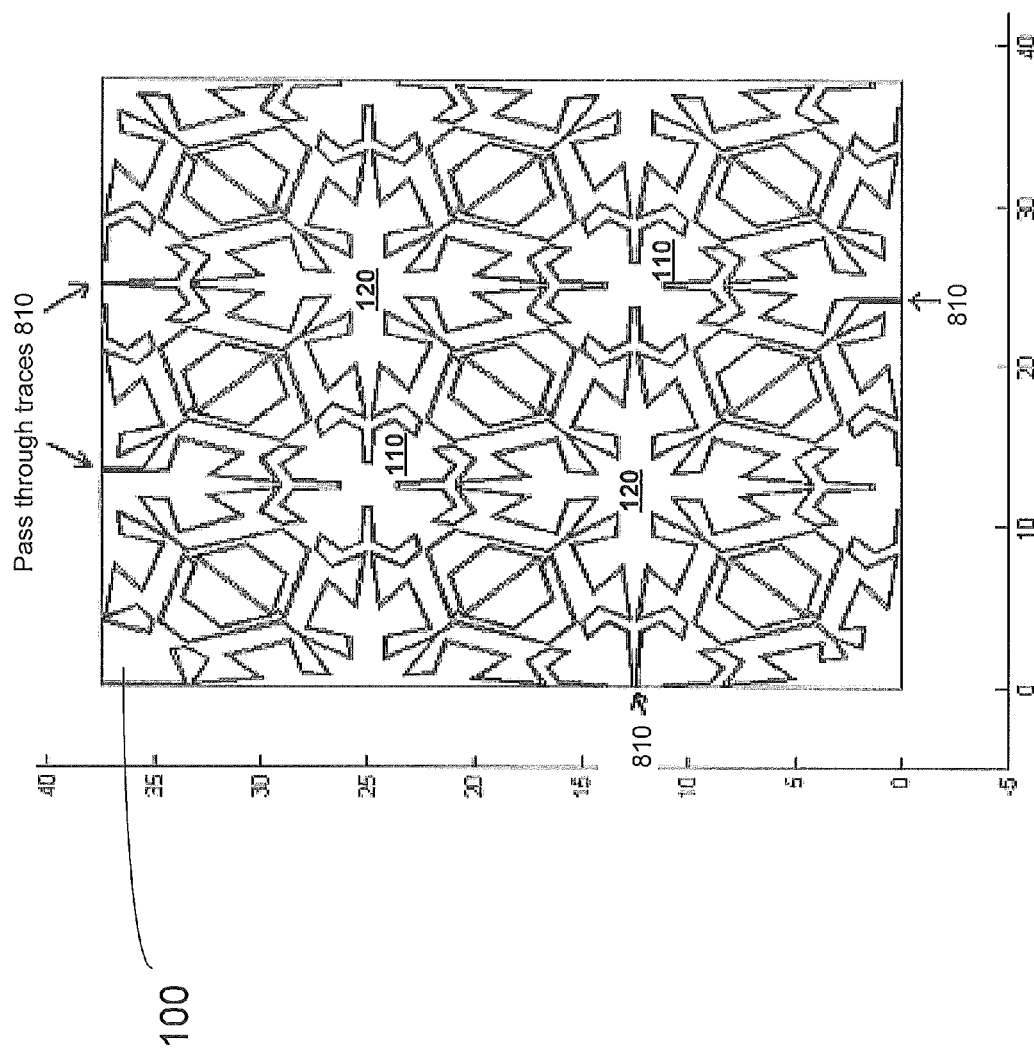
FIG. 8 shows a layout of conductive sensor elements for a single layer touch screen as in FIG. 2, including pass-through traces, according to some embodiments.

FIG. 8 shows layout 100 for a single layer touch screen including pass-through traces 810, according to some embodiments. Traces 810 may allow sensing elements 110 and 120 located in the interior portion 102 of layout 100 to be reached through the edges of layout 100. Traces 810 may couple sensing elements 110 and 120 to controller 20 located outside of layout 100 (cf. FIG. 1). According to embodiments consistent with FIG. 8, traces 810 may be formed in the same conducting layer as sensing elements 110 and 120. Thus, a touch screen sensor may be formed in a single conductive layer deposited on a dielectric substrate. It may be desirable for traces 810 to be as narrow as possible so that the total area of layout 100 covered by traces 810 be minimal. On the other hand, it is desirable that traces 810 provide effective electrical conductance to a sensing element in interior portion 102. According to some embodiments, the thickness of traces 810 may be the same or similar to the thickness of gap 150 (cf. FIG. 7). A detailed explanation of the layout of traces 810 is provided in relation to FIG. 9, as follows.

Figure 9:
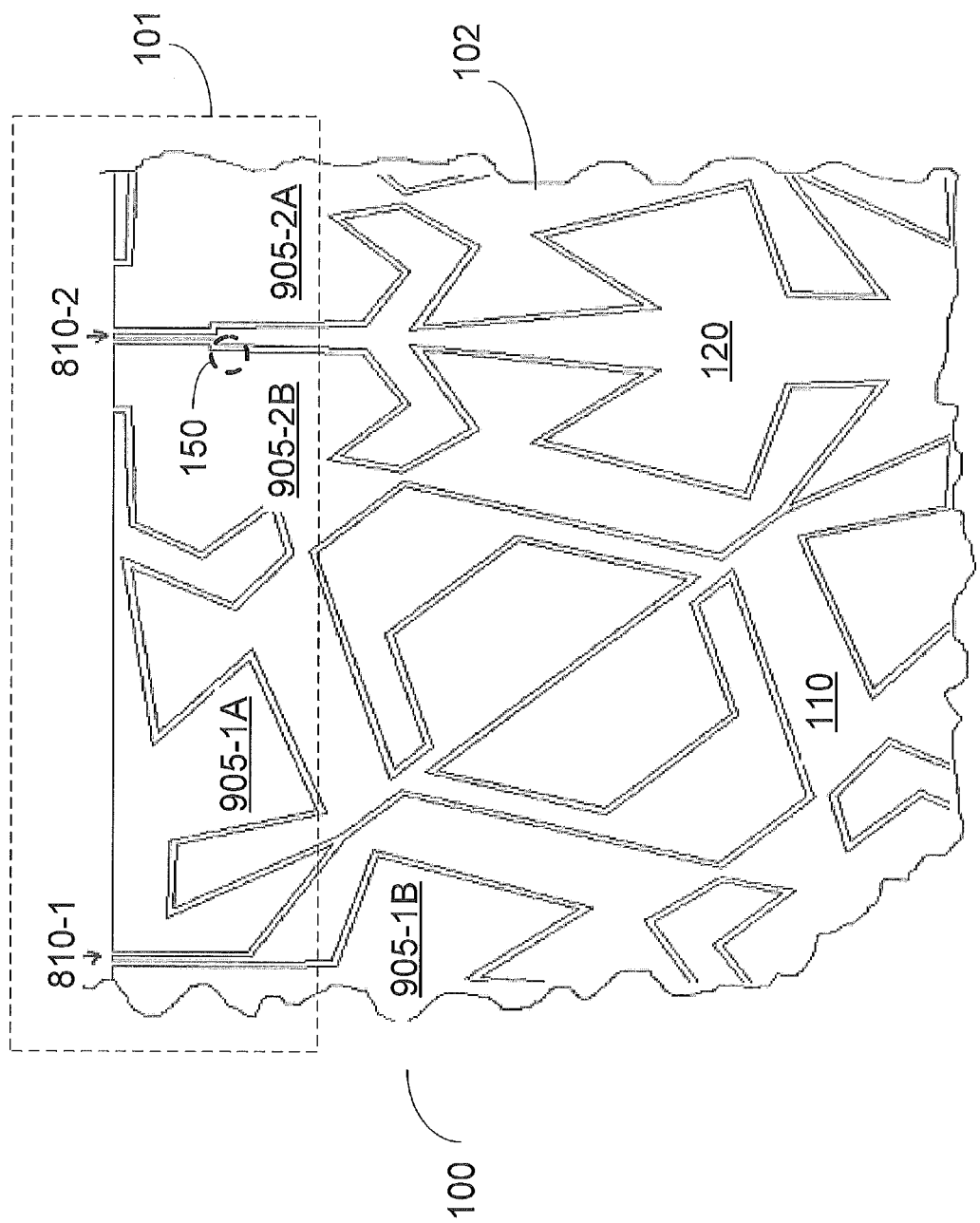
FIG. 9 shows a cut away of a layout of conductive sensor elements for a single layer touch screen as in FIG. 8, including pass-through traces.

FIG. 9 shows a cut away of layout 100 and edge portion 101 including sensor elements 110 and 120 with pass-through traces 810-1 and 810-2, according to some embodiments. Trace 810-1 may couple sensing element 110 to edge portion 101. And trace 810-2 may couple sensing element 120 to edge portion 101. Note that according to the embodiment illustrated in FIG. 9 trace 810-1 may pass through element 905-1. In order to avoid any coupling between elements 905-1 and 110, some embodiments may split element 905-1 in two portions: 905-1A and 905-1B. While portions 905-1A and 905-1B may seem disconnected in layout 100, they may be coupled electrically in edge portion 101 or in touch controller 20 (cf. FIG. 1). Likewise, trace 810-2 may pass through element 905-2. In order to avoid any coupling between elements 905-2 and 120, some embodiments may split element 905-2 in two portions: 905-2A and 905-2B. While portions 905-2A and 905-2B may seem disconnected in layout 100, they may be coupled electrically in edge portion 101 or in touch controller 20 (cf. FIG. 1).

While the presence of traces 810-1 and 810-2 alters the geometry of layout 100 in relation to elements 110 and 120, the changes introduced by traces 810 are limited. Embodiments consistent with layout 100 (FIG. 2) are such that even sensing elements such as 110 and 120 occupying a substantial portion of interior portion 102, may have portions near edge portion 101. Thus, the length needed for traces 810-1 and 810-2 to reach interior elements 110 and 120 may be reduced substantially.

Figure 10:
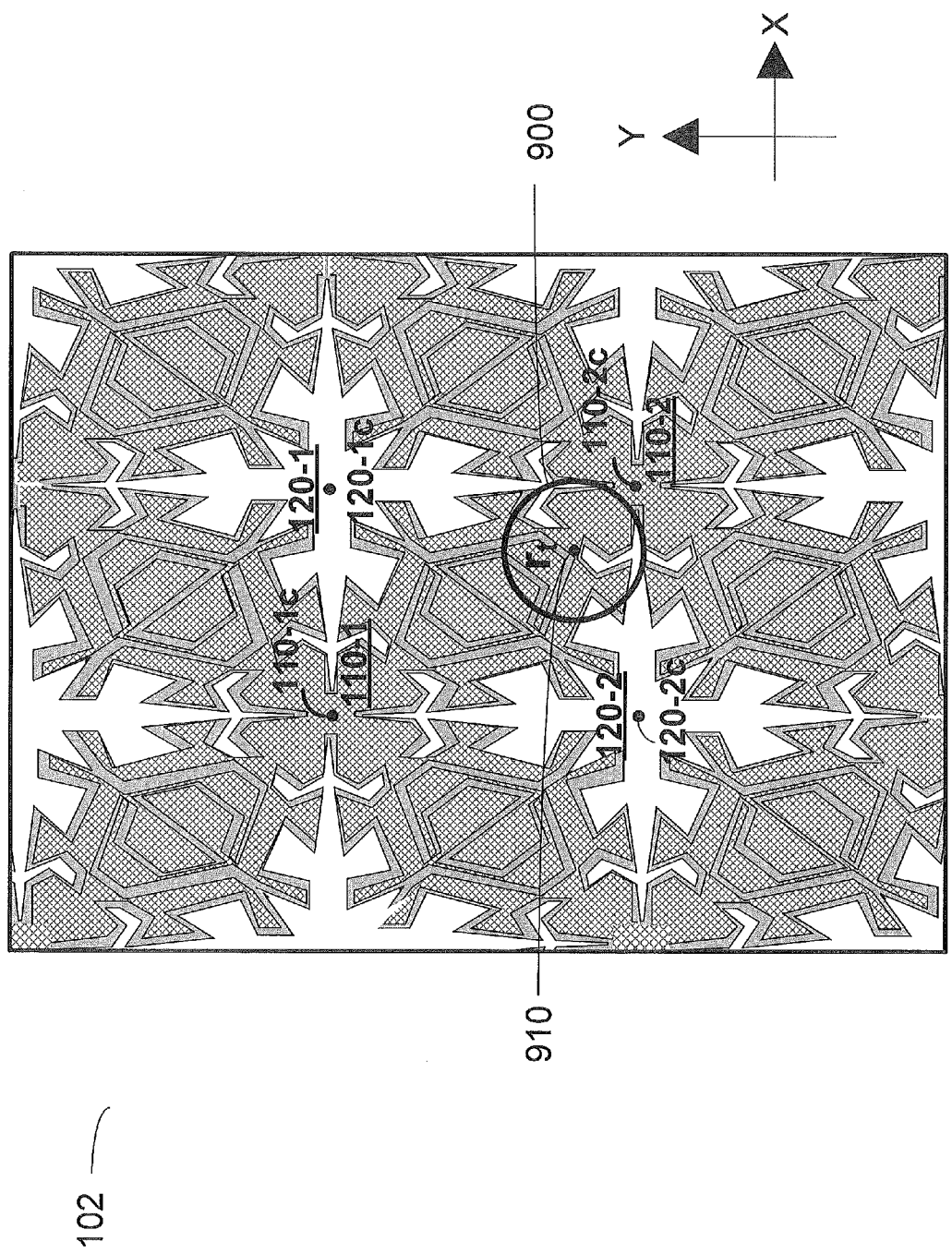
FIG. 10 shows a single touch on a layout of conductive sensor elements for a single layer touch screen as in FIG. 2, according to some embodiments.

FIG. 10 shows an example of a touch 900 on layout 100, according to some embodiments. Touch 900 according to FIG. 10 may be circular, having center 910 ($r_t$) with coordinates ($x_t$, $y_t$), and touch area $A_{touch}$. Some embodiments may have touch 900 with different geometries, and still be consistent with the calculation of a touch location according to FIG. 10. As illustrated in FIG. 10, touch 900 has an area $T_t$ overlapping sensing elements 110-1 ($T_1$), 110-2 ($T_2$), 120-1 ($T_3$) and 120-2 ($T_4$). A total touch overlap $A_T = T_1 + T_2 + T_3 + T_4$ may be obtained, so that an overlap proportion, $T_i/A_T$, may be designated for each touched element. Note that $A_T \ne A_{touch}$ because of the presence of gap 150, which may be insensitive to capacitive coupling by touch 900.

Using the centroid $r_i$, and overlap proportion ($T_i/A_T$) of each sensing element 110-1 ($T_1/A_T$, $r_1$), 110-2 ($T_2/A_T$, $r_2$), 120-1 ($T_3/A_T$, $r_3$), and 120-2 ($T_4/A_T$, $r_4$), location 910 ($r_t$) may be approximated as:

$$\vec{r}_t \approx \vec{R}_{loc} = \left(\frac{T_1}{A_T}\right) \cdot \vec{r}_1 + \left(\frac{T_2}{A_T}\right) \cdot \vec{r}_2 + \left(\frac{T_3}{A_T}\right) \cdot \vec{r}_3 + \left(\frac{T_4}{A_T}\right) \cdot \vec{r}_4 \quad (1)$$

According to embodiments consistent with FIGS. 1-10, the value of ($T_i/A_T$) may be measured by touch controller assuming that a change in capacitance of element "i" is approximately proportional to the value of ($T_i/A_T$).

Table I shows a list of values for $T_1/A_1$ and $r_1$, $T_2/A_2$ and $r_2$, $T_3/A_3$ and $r_3$, and $T_4/A_4$ and $r_4$, consistent with FIG. 10. Table I also provides the value of $r_t$ and the value $R_{loc}$ calculated using Eq. (1).

TABLE I

|  | 110-1 | 110-2 | 120-1 | 120-2 |
|---|---|---|---|---|
| $T_i/A_i$ | 20.02% | 58.03% | 7.01% | 14.94% |
| $(r_{ix}, r_{iy})$ | (12.5, 25) | (25, 12.5) | (25, 25) | (12.5, 12.5) |
| $(r_{tx}, r_{ty})$ | (20.6, 16) | | | |
| $(R_{localx}, R_{localy})$ | (20.63, 15.88) | | | |

In general, touch 900 may overlap any number of 'k' elements. In such embodiments, a position $R_{local}$ may be calculated by the following expression:

$$\vec{r}_t \approx \vec{R}_{loc} = \sum_{i=1}^{k} \left(\frac{T_i}{A_T}\right) \cdot \vec{r}_i \quad (2)$$

Where $A_T$ is given by $$A_T = \sum_{i=1}^{k} T_i.$$

As can be seen in Table I, Eq. (2) renders an accurate 2D location for touch 900, with a location error, $e_{loc} = R_{loc} - r_t$. In general, the magnitude of location error ($|e_{loc}|$) is not zero: $|e_{loc}| \neq 0$. In some embodiments consistent with FIGS. 1-10 additional calculations or calibration steps may be included to reduce location error. The magnitude of location error $|e_{loc}|$ may vary according to the location of $r_t$ 910. For example, for $r_t$ 910 in edge portion 101, $e_{loc}$ may have a larger value compared to $r_t$ 910 at inner portion 102. Also, overlap proportion $T_i/A_T$ may be corrected to account for the position of overlap $T_i$ relative to the centroid $r_i$ of touch element 'i.'

Thus, in some embodiments overlap proportion $T_i/A_T$ for a given sensing element may be complemented with weight factor $f_i$ for vector $r_i$ in Eq. (2):

$$\vec{r}_t \approx \vec{R}_{loc\_new} = \sum_{i=1}^{k} f_i(\vec{R}_{loc\_old}) \cdot \left(\frac{T_i}{A_T}\right) \cdot \vec{r}_i \quad (3)$$

According to Eq. (3), factor $f_i(R_{loc\_old})$ depends on location 910 through a previously calculated $R_{loc\_old}$. That is, Eq. (3) is a recursive expression for $R_{loc}$, providing $R_{loc\_old}$ from the previously calculated value of $R_{loc\_old}$. Without prior knowledge of the value for $f_i$, $R_{loc\_old}$ may be obtained using Eq. (2). For example, $R_{loc\_old}$ may indicate that $r_t$ location 910 inside edge portion 101. $R_{loc\_old}$ may also indicate a distance between $r_t$ location 910 and $r_i$, and factor $f_i$ may compensate overlap $T_i/A_T$ in an inverse proportion to $|R_{loc\_old} - r_i|$. This is described in detail in relation to FIG. 11, below. The complementary factor $f_i$ associated to a sensing element 'i' for a touch location may be adjusted for aberrations caused by the sensing capability of each sensing element and their electronic coupling to the controller circuit.

Figure 11:
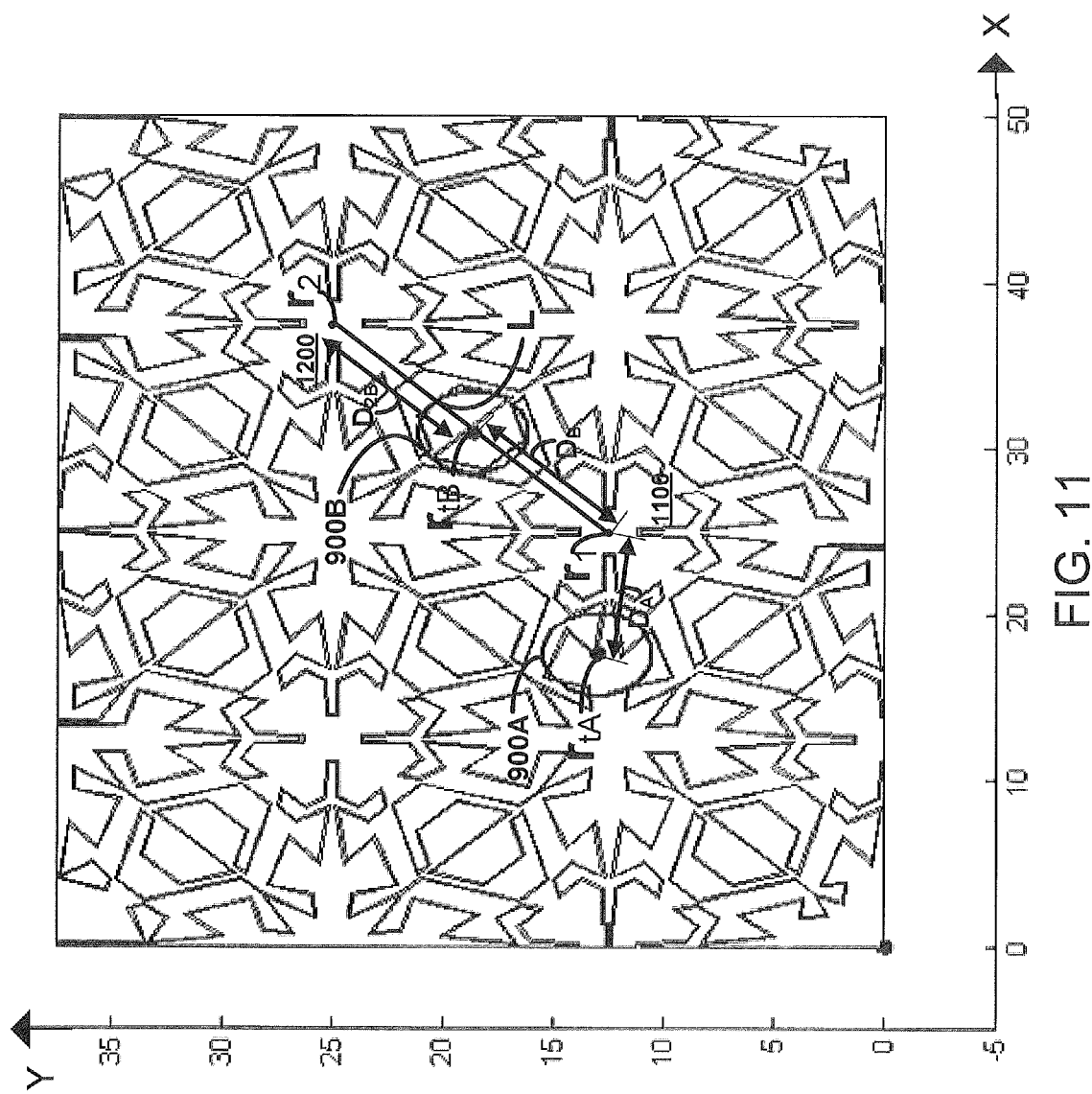
FIG. 11 shows two touches on a layout of conductive sensor elements for a single layer touch screen as in FIG. 2, according to some embodiments.

FIG. 11 shows touches 900A and 900B overlapping sensor elements 1100 and 1200, according to some embodiments of layout 100. Other elements that may overlap touches 900A and 900B are not labeled in FIG. 11, for simplicity. Touches 900A and 900B may have different overlap proportions of $T_{1100A}/A_T$ and $T_{1100B}/A_T$ for element 1100. For example, according to the embodiment depicted in FIG. 11, $T_{1100A}/A_T \approx 33.07\%$, and $T_{1100A}/A_T \approx 47.33\%$. This is a result of positions $R_{loc\_newA}$ and $R_{loc\_newB}$ having different contributions of $r_1$ according to different touch locations 910A ($r_{tA}$), 910B ($r_{tB}$). FIG. 11 clearly shows that the distance $D_A$ between touch 900A and centroid $r_1$ is smaller than distance $D_B$ between touch 900B and centroid $r_1$, even though $T_{1100A}/A_T$ is smaller than $T_{1100B}/A_T$. This example shows that the contribution of $T_{1100A}/A_T$ may not be monotonically increasing, even for a touch closer to $r_1$.

Further shown in FIG. 11, location 910B lies along straight segment L joining centroids $r_1$ and $r_2$ for elements 1100 and 1200, respectively. In FIG. 11, $T_{1100B}/A_T \approx 47.33\%$, and $T_{1200B}/A_T \approx 52.67\%$. Consequently, overlap factors between elements 1100, 1200 and touch 900B obey the following relation:

$$(T_{1200B}/A_T) > (T_{1100B}/A_T)$$

It is also clear form FIG. 11 that $r_{tB}$ is closer to $r_1$ than to $r_2$, along line L ($D_{2B} > D_B$). Due to factors such as parasitic capacitance, in some embodiments the capacitance measured for $T_{1200B}/A_T$ may be lower than the capacitance measured for $T_{1100B}/A_T$. In such case, the contribution of $r_1$ to $R_{loc\_oldB}$ may be lower than the accurate value and the contribution of $r_2$ to $R_{loc\_oldB}$ may be greater than the accurate value. Thus, the calculated touch may be closer to $r_2$ than the true touch. Thus, the calculation for $R_{loc\_newB}$ may use a complementary weight factor $f_1(R_{loc\_oldB})$ for $T_{1200}/A_T$ to enhance the contribution of $r_1$. Likewise, $R_{loc\_newB}$ may use a complementary weight factor $f_2(R_{loc\_oldB})$ for $T_{1100}/A_T$ to reduce the contribution for $r_2$.

The precise value for factors $f_i$ may be dependent on the size of $A_{touch}$. Embodiments consistent with the detailed description of FIGS. 1 to 11 above may support finger or stylus touch sizes from approximately 2 mm to approximately 18 mm in diameter. Other diameters may be used, according to the requirements of the application considered.

Thus, in embodiments consistent with FIG. 11, a first touch location $R_{loc\_old}$ may be obtained using Eq. (2). The value of $R_{loc\_old}$ may be used by touch controller 20 to obtain complementary factor $f_i(R_{loc\_old})$. In some embodiments, complementary factor $f_i(R_{loc\_old})$ may be an analytic expression using the coordinate values of point $R_{loc\_old}$. Some embodiments may use a lookup table of values $f_i$ stored in memory circuit 40, according to a discrete set of positions. Thus, a value $f_i$ may be selected corresponding to a position which is close to $R_{loc\_old}$. With complementary factor $f_i$, processor 30 in touch controller 20 may use Eq. (3) to find a corrected location $R_{loc\_new}$. The process may be iterated more than once, and as many times as necessary in order to obtain a magnitude of location error $|e_{loc}|$ that is no greater than a pre-selected value.

In some embodiments, the number of iterations taken by touch controller 20 may be determined by calibration of touch sensor 10 for a given size of layout 100, and $A_{touch}$. A calibration of touch sensor 10 may include the use of a "touch" device having area $A_{loud}$, and attached to a precise location mechanism, such as a robot. The touch device is scanned along pre-established trajectories on layout 100. For example, the trajectories may include straight lines parallel along the 'X' and 'Y' axes of layout 100 (cf. FIG. 2). Location measurements from touch sensor 10, $R_{loc}$, are collected at a number of points along the calibration trajectories, and compared to the precise location positions measured by the robot. Thus, a map of $|e_{loc}|$ values may be provided for each of the calibration points selected. Further, each map may be compared to other calibration runs, in order to select the configuration that provides the lowest location errors. For example, the number of iterations used with Eq. (3) may be incremented from one calibration run to the next, until a sufficiently low value of location error is obtained for every calibration point.

Some embodiments may provide a map of values for complementary factors $f_i$ for each pre-selected calibration point. Thus, a value for $f_i$ may be stored in memory circuit 40 for each calibration point and for each sensing element 'i.' Once $R_{loc\_old}$ is obtained for an arbitrary touch 900, memory circuit 40 selects the complementary factor $f_i(R_{loc\_old})$ by looking up in the stored table of values for the calibration position closest to $R_{loc\_old}$.

Figure 12:
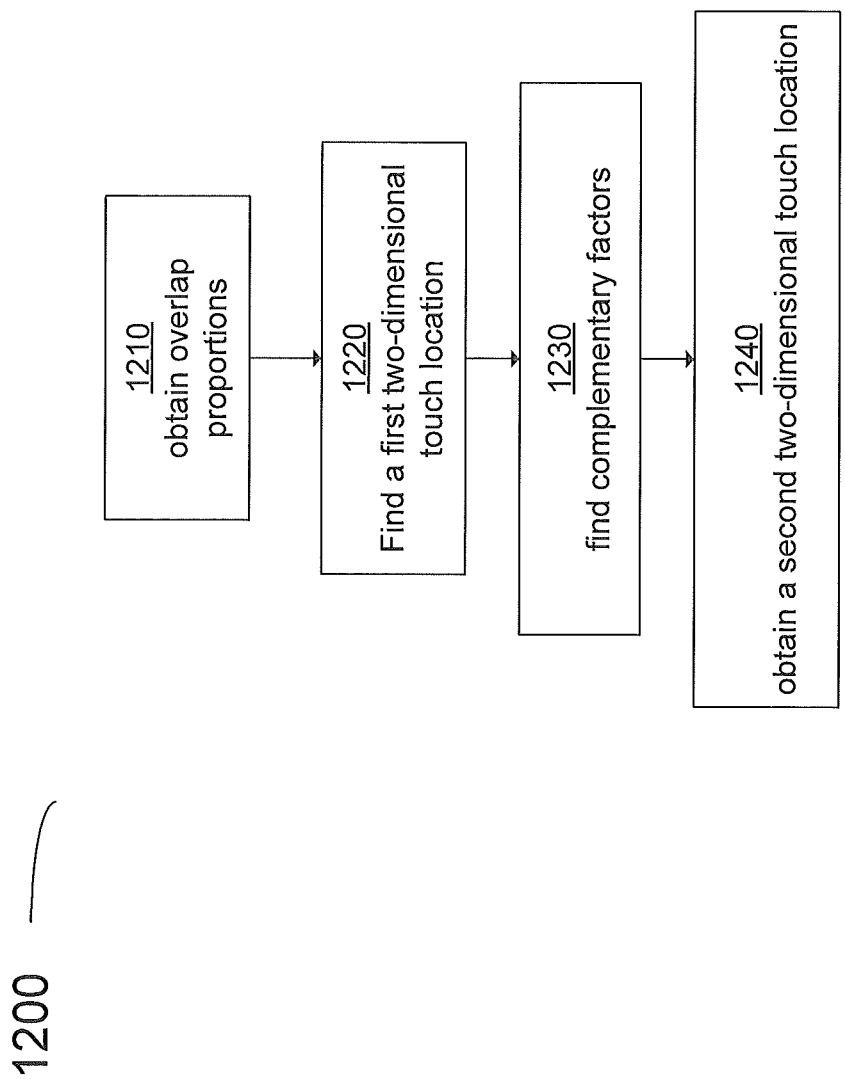
FIG. 12 shows a flow chart for a method of using a controller circuit to find a two-dimensional location on a touch screen according to some embodiments.

FIG. 12 shows a flow chart for a method 1200 of using controller 20 to find a two-dimensional location 910 on a touch screen as described in FIGS. 10 and 11. In step 1210, overlap proportions between touch 900 and sensing elements in a touch screen are obtained. For example, sensing elements may be such as elements 110 and 120 in layout 100 (cf. FIG. 10). The overlap proportion of touch 900 may be obtained by coupling a signal from each sensing element 110 and 120 in layout 100 to controller 20 using connector 50 (cf. FIG. 1). In some embodiments, a capacitance coupling circuit in controller 20 may be used to obtain an overlap proportion for touch 900 with each of sensing elements 110 and 120. In step 1220 a first two-dimensional location is obtained ($R_{loc\_old}$) by controller 20, using the overlap proportions. In some embodiments, step 1220 may be performed by arithmetic operations such as described in Eq. (2).

Using the first two-dimensional location ($R_{loc\_old}$) controller 20 may perform step 1230 in which complementary factors $f_i(R_{loc\_old})$ are obtained. According to embodiments consistent with FIGS. 10 and 11, a complementary factor $f_i$ may be obtained for each sensing element 110 and 120 in layout 100. Some embodiments may obtain factors $f_i$ for elements overlapping touch 900. For example, in some embodiments the complementary factors $f_i$ may be obtained only for sensing elements having an overlap proportion different from zero. Moreover, some embodiments may obtain complementary factor $f_i$ according to a first two-dimensional location $R_{loc\_old}$, and also according to element 'i.' For example, for elements 'i' located inside edge portion 101 of layout 100 the complementary factor $f_i$ may be different than for elements in portion 102. This may provide error correction for a touch 900 near the edge of layout 100.

Once complementary factors $f_i$ are obtained in step 1230, controller 20 may perform step 1240 in which a second two-dimensional touch location ($R_{loc\_new}$) is obtained. In some embodiments, $R_{loc\_new}$ may be obtained by using factors $f_i$ from step 1230 and overlap proportions from step 1210 in Eq. (3). Complementary factor $f_i$ may be greater than one (1), equal to one (1), smaller than one (1), or zero, according to embodiments consistent with FIG. 11.

In some embodiments consistent with FIGS. 10, 11 and 12, steps 1220 through 1240 in method 1200 may be repeated a predetermined number of times, 'N.' The value of 'N' may be obtained from previous calibration processes as described above. Furthermore, 'N' may be dependent on the value of $R_{loc\_old}$. For example, if $R_{loc\_old}$ is within edge portion 101, then 'N' may be larger than one (1), such as two (2), three (3), or even larger.

Figure 13:
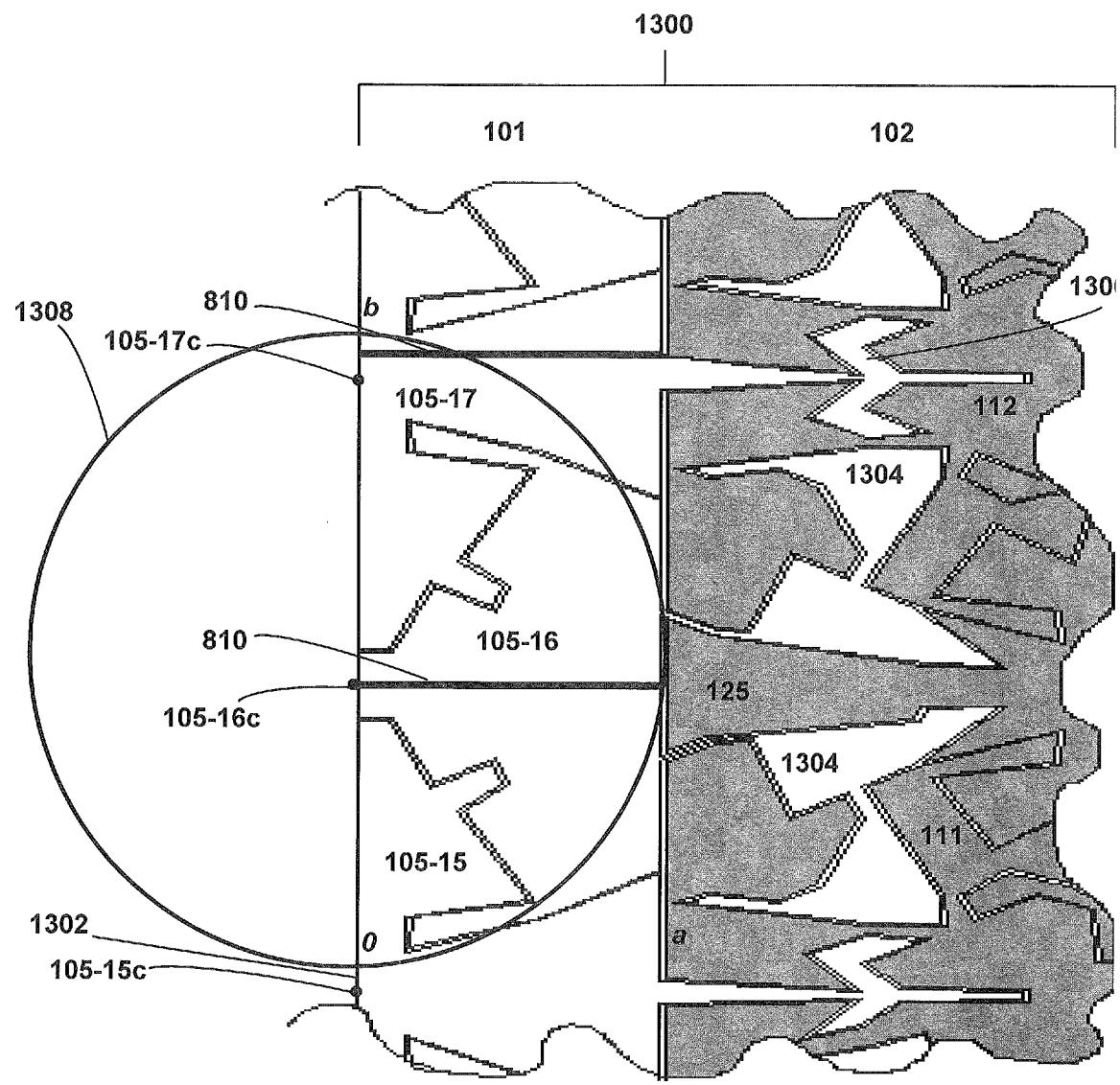
FIG. 13 shows a cut away of conductive sensor elements along an edge of a single layer touch screen as in FIG. 2, according to some embodiments.

FIG. 13 shows a cut away of conductive sensor elements along an edge of a single layer touch screen as in FIG. 2, according to some embodiments. Along an edge of touch screen 100, there is an area 1300 which includes edge portion 101 and interior portion 102, and therefore also includes edge sensing elements and interior sensing elements. In FIG. 13, the interior sensing elements are shown as shaded. In typical touch sensors, accuracy and linearity at an edge area is diminished because sensing elements arranged at an edge area are often only receiving a half of a touch or, at a corner, a quarter of a touch. In addition, typical sensing elements arranged in an edge area will determine a distance to either be right at the edge or to be further inward of the actual touch. However, a sensor arrangement such as shown in FIG. 12 provides increased accuracy and linearity of touches made in edge area 1300.

As shown in FIG. 13, edge sensor elements, such as 105-16 and 105-17, are arranged along an edge portion 101 of touch screen sensor 100 and interior sensor elements, such as 112, 125, and 111, are arranged away from the edge 1302 of touch screen sensor 100 in interior portion 102. Edge sensor element 105-16 has a centroid 105-16c and edge sensor element 105-17 has a centroid 105-17c. Consistent with some embodiments, centroids 105-16c and 105-17c are located at edge 1302. Pass-through traces 810 are formed to split edge sensor elements 105-16 and 105-17, and couple edge sensor elements and interior sensor elements to external circuitry such as controller 20 through connector 50 (cf. FIG. 1).

Consistent with some embodiments, edge sensor elements are formed to have one or more patterns having a width that increases non-monotonically in two directions. Moreover, edge sensor elements may be formed to have patterns which differ from the sensor element patterns of interior sensor elements or the patterns of adjacent edge sensor elements. Edge sensor elements may also be formed to have areas that extend into interior portion 102. For example, as shown in FIG. 13, edge sensor element 105-16 includes areas 1304 which extend into interior portion 102. Similarly, edge sensor element 105-17 includes area 1306 that extends into interior portion 102. Consistent with some embodiments, edge sensor elements generally interlace with interior sensor elements only in interior portion 102.

As shown in FIG. 13, interior sensor elements are generally arranged such that they do not extend beyond about a predetermined distance a away from edge 1302. For example, interior sensor elements 111, 112, and 125 extend out from interior portion 102 to predetermined distance a, but generally do not extend beyond this distance or otherwise interlace with interior sensor elements 111, 112, 125 or edge sensor elements 105-15, 105-16 and 105-17 beyond this point. Consistent with some embodiments, distance a is about half the distance of the diameter of a user touch which has a diameter of about b. As discussed above, since a user touch of about diameter b may vary between 2 mm and 18 mm, predetermined distance a may be between about 1 mm and 9 mm in some embodiments. The user touch may be a contact with a human finger, or a suitable device providing a capacitive contact to the sensing elements, such as a stylus, but are not limited thereto. Although the values provided above may approximate a range covered by a user touch made by a human finger or other device providing a capacitive contact, the values may vary based on the specific capacitive device used to make a touch on touch screen 100. According to some embodiments, all of the interior sensing elements do not extend beyond about a predetermined distance a away from edge 1302. According to other embodiments, approximately as many as about 80% of the interior sensing elements do not extend beyond about a predetermined distance a away from edge 1302. According to still yet other embodiments, about half of the interior sensing elements extend beyond about a predetermined distance a away from edge and about half of the interior sensing elements do not extend beyond about a predetermined distance a away from edge 1302.

Returning to FIG. 13, by arranging the interior sensor elements so that their outer edges extend about a predetermined distance a away from edge 1302 and arranging the edge sensor elements to extend into the interior portion such that the edge sensor elements generally only interlace with the interior sensor elements in the interior portion, the location of touches that overlap an edge area 101 and extend beyond a sensor area will be determined based on centroids of only edge sensor elements such as elements 105-15, 105-16, and 105-17. For example, a user touch 1308 overlaps edge sensing elements 105-15, 105-16, and 105-17, and also overlaps the area outside of the sensing area. Consequently, consistent with the discussion above, the location of user touch 1308 will be determined based on the proportional area of touch on edge sensing elements 105-15, 105-16, and 105-17 and as well as centroids 105-15c, 105-16c, and 105-17c. This will allow the touch location to be determined based on three edge sensor elements having centroid at edge 102. Because centroids 105-15c, 105-16c, and 105-17c are located at 1302, the sensed touch from 0 to a will effectively be pulled out to edge 1302, compensating for the unsensed touch beyond edge 1302, thus providing greater accuracy for touches made at, and extending beyond, an edge portion 1300 of the sensor.

Figure 14:
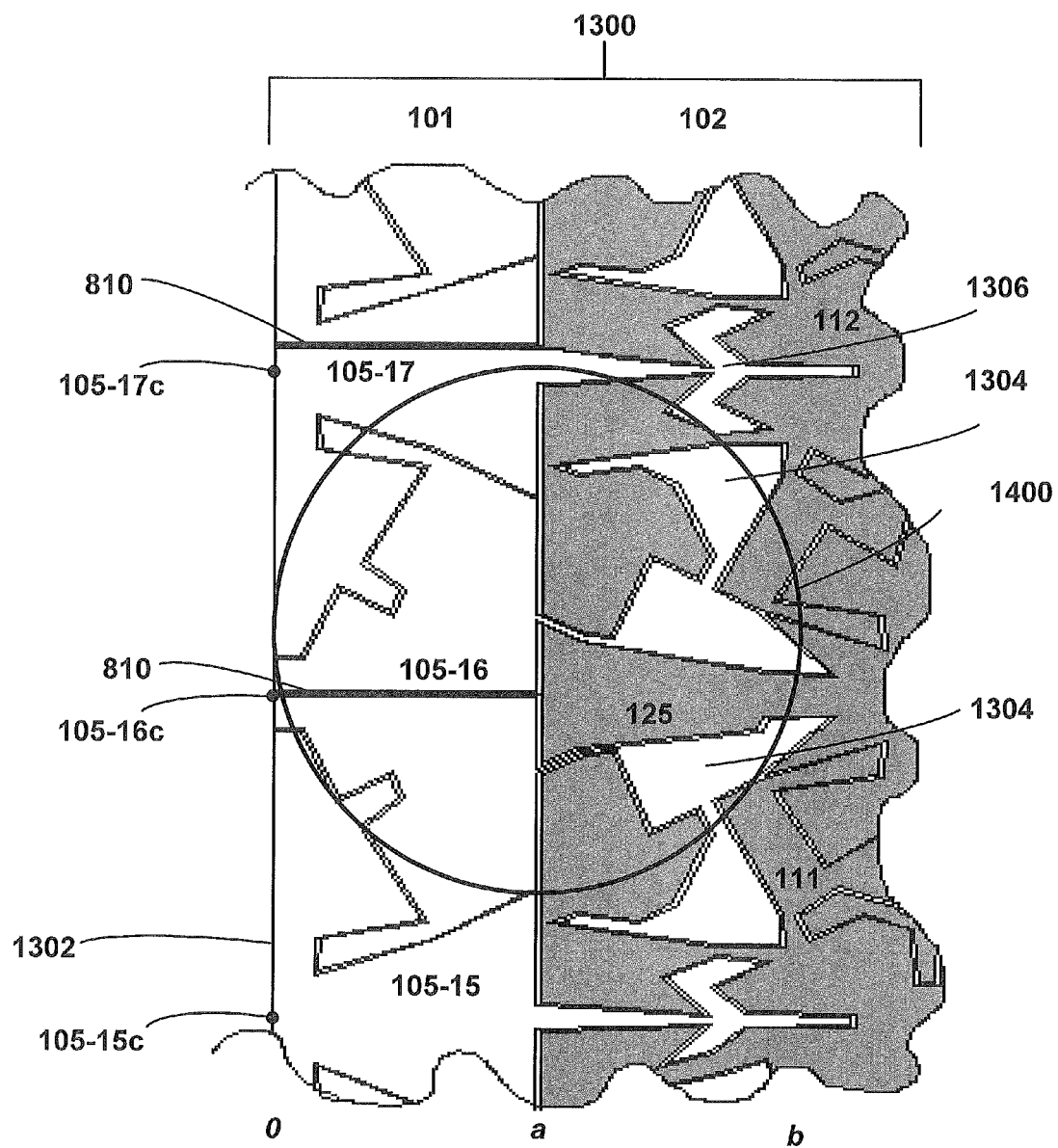
FIG. 14 shows a cut away of conductive sensor elements along an edge of a single layer touch screen as in FIG. 2, according to some embodiments.

FIG. 14 shows a cut away of conductive sensor elements along an edge of a single layer touch screen as in FIG. 2, according to some embodiments. FIG. 14 is similar to FIG. 13, but illustrates a user touch 1400 that partially overlaps edge sensor elements in edge portion 101 and interior sensor elements in interior sensing area 102. As shown in FIG. 14, by generally arranging the interior sensor elements at a predetermined distance a away from edge 1302 and by generally arranging the edge sensor elements to extend into the interior portion such that the edge sensor elements generally only interlace with the interior sensor elements in the interior portion. Consequently, the calculation of the touch location is determined by the area overlapping the touch and the edge area and an interior area weighted by the centroids of both edge sensor elements and interior sensor elements which will provide greater positional accuracy. That is, touches overlapping both an edge sensor element and an interior sensor element, will have the location determined based on at least one edge sensor element and at least one interior sensor element. For example, user touch 1400 overlaps edge sensing elements 105-15, 105-16, and 105-17, and interior sensing elements 111, 112, and 125. Consequently, consistent with the discussion above, the location of user touch 1400 will be determined based on the proportional area of touch on edge sensing elements 105-15, 105-16, and 105-17 and interior sensing elements 111, 112, and 125, as well as centroids 105-15c, 105-16c, 105-17c, and the centroids of interior sensing elements 111, 112, and 125, which are shown in FIG. 2, and are further away from edge 1302. This will allow the touch location to be determined based on six different sensor elements, including three edge sensor elements having centroid at edge 102. In addition, because interior sensing elements generally do not extend beyond distance a from edge 1302, and edge sensor elements generally interlace with interior sensor elements in interior portion 102, a proper proportion of touch will be registered on edge sensor elements. Thus, this arrangement will provide greater accuracy and linearity of touches made in an edge area.

Figure 15:
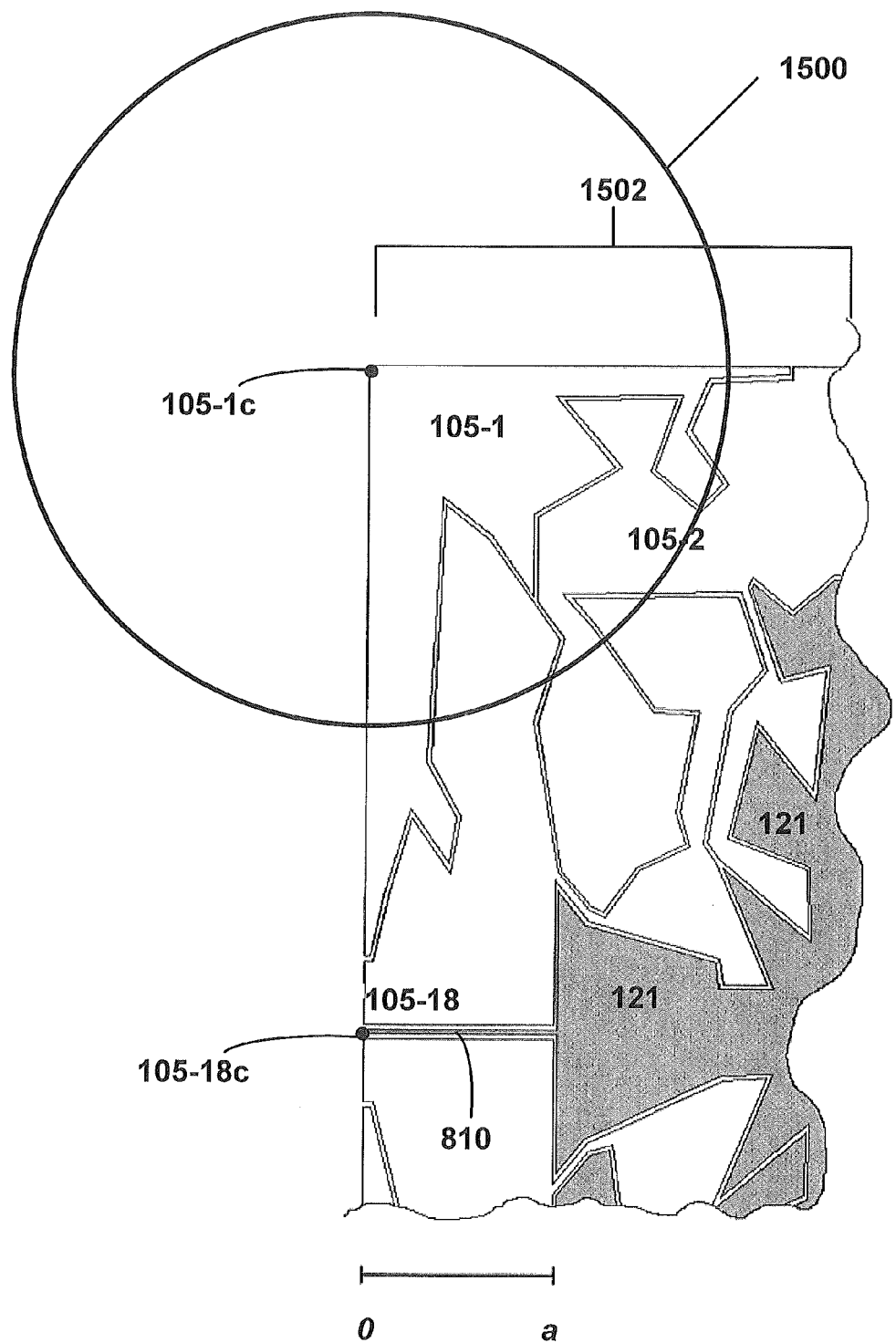
FIG. 15 shows a cut away of conductive sensor elements at a corner of a single layer touch screen as in FIG. 2, according to some embodiments.

FIG. 15 shows a cut away of conductive sensor elements at a corner of a single layer touch screen as in FIG. 2, according to some embodiments. As shown in FIG. 15, a touch 1500 at corner edge area 1502 overlaps edge sensors 105-1, 105-2 and 105-18, and interior sensor 121. Since a greater portion of a touch area of touch 1400 overlaps edge sensors, the determined location of touch 1500 will be "pulled outward" by the centroids of edge sensors 105-1, 105-2, and 105-18 which are along the edge of touch screen 100. Thus, a determined touch location will be more accurate at corner edge area 1502.

Figure 16:
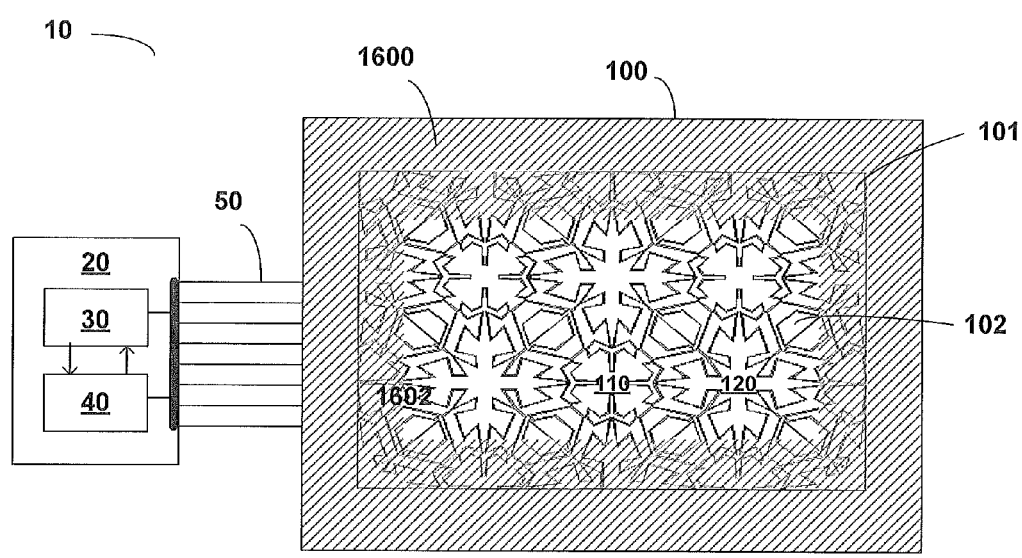
FIG. 16 shows a single layer touch screen in an enclosure, according to some embodiments.

FIG. 16 shows a single layer touch screen in an enclosure, according to some embodiments. As shown in FIG. 16, touch screen device 10 is coupled to controller 20. Controller 20 includes a processor circuit 30 coupled to a memory 40. Connector 50 couples controller 20 to touch screen layout 100. Touch screen layout 100 includes an edge portion 101 and an interior portion 102. Consistent with some embodiments, touch screen layout 100 may be enclosed in enclosure 1600. According to some embodiments, enclosure 1600 may be a bezel of an electronic device. According to other embodiments, enclosure 1600 may be a non-insulative paint, dye, or other covering which obscures the optical transmittance of the area for the sensor elements beneath enclosure 1600 while allowing the sensor elements to detect a touch made thereon. As shown in FIG. 16, enclosure 1600 encloses touch screen layout 100 such that the enclosure 1600 covers edge portion 101, while interior portion 102 remains uncovered by enclosure 1600. Consistent with some embodiments, enclosure 1600 may be arranged to only cover an area defined as extending in from a predetermined distance from edges of touch screen layout. Consistent with some embodiments, edge portion 101 and interior portion 102, in combination, form a field of touch 1602, with interior portion 102 being translucent for display viewing and edge portion 101 being opaque.

Figure 17:
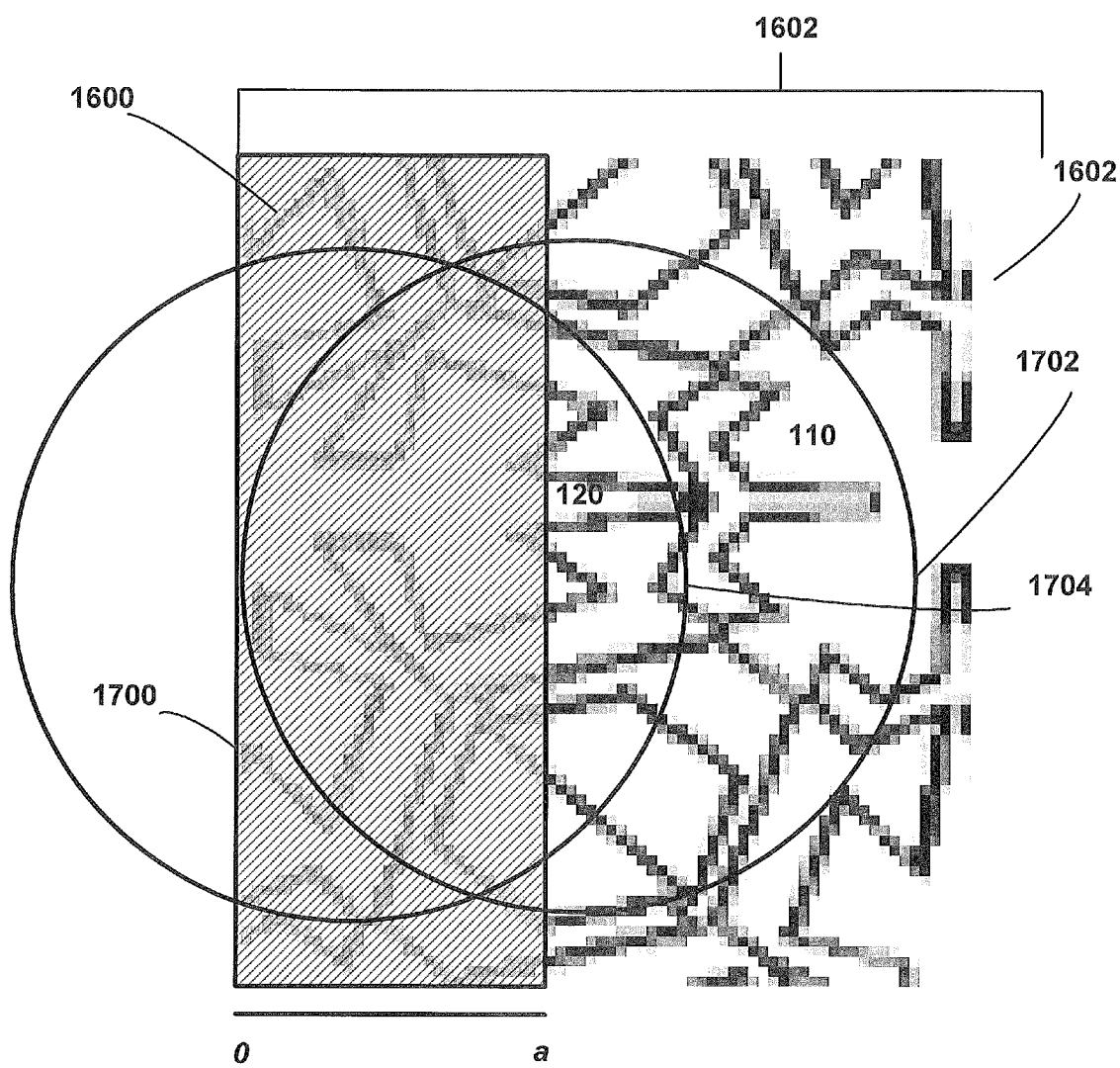
FIG. 17 shows a cutout of single layer touch screen in an enclosure arranged to only cover an area defined as extending in from a predetermined distance from edges of touch screen layout.

FIG. 17 shows a cutout of single layer touch screen in an enclosure arranged to only cover an area defined as extending in from a predetermined distance from the edges of touch screen layout. In some embodiments, the covered area may correspond to edge portion 101, such as shown in FIG. 16. However, in other embodiments, the covered area may be defined as extending in from a predetermined distance a from edges 1700 of touch screen layout 100. In other embodiments, as described with respect to FIG. 16, enclosure 1600 may be composed of paint, dye, or other appropriate covering which obscures the optical transmittance of the sensor elements beneath enclosure 1600. As shown in FIG. 17, sensing elements in interior portion 102 and in edge portion 101 form a field of touch 1602 wherein user touches will be sensed. Touches, such as touch 1702 occur in field of touch 1602, and these touches partially overlap sensors in interior portion 102, and sensors at edge portion 101 covered by enclosure 1600. Touches sensed in these areas will cover an area having relatively equivalent areas of sensing elements which have centroids in edge portion 101 and in interior portion 102 which allows for greater accuracy and linearity of touches sensed in field of touch 1602. Moreover, according to some embodiments, memory 40 may include instructions that, when executed by processor 30, will automatically determine that a touch, such as touch 1702, that includes a sensed area including an area beneath enclosure 1600 to be automatically determined at a distance a from edge 1700, i.e., to be at an edge of the interior portion 102. In such embodiments, interior portion 102 may correspond to the translucent area of touch sensor 101. Furthermore, according to some embodiments, memory 40 may include instructions that, when executed by processor 30, will automatically ignore a touch, such as touch 1704, that includes only a sensed area including an area beneath enclosure 1600.

Some embodiments consistent with the description provided in FIGS. 1-17 may correspond to flat touch screens. In some embodiments consistent with the description provided for FIGS. 1-17 a two-dimensional touch sensor layout may be placed on a portion of surface of a three-dimensional (3-D) object. For example such a 3-D object may include a cylindrical shape such as a handlebar used in a bicycle or a treadmill machine. In some embodiments, a 3-D object may have a round shape, or a spherical shape, such as a ball, a helmet, or a visor screen.

Embodiments described herein are exemplary only. One skilled in the art may recognize various alternative embodiments from those specifically disclosed. Those alternative embodiments are also intended to be within the scope of this disclosure. As such, the embodiments are limited only by the following claims.

What is claimed is:

1. A sensor comprising:
   a planar sensing area including a sensor layout, the sensor layout comprising:
     an interior portion, an edge portion, and edges;
     interior sensing elements, the interior sensing elements being located in the interior portion; and
     edge sensing elements, the edge sensing elements being located in the edge portion, wherein:
       the interior sensing elements are arranged in the sensor layout such that at least half of the interior sensing elements do not extend beyond a predetermined distance from the edges; and
       the edge sensing elements are arranged to extend beyond the predetermined distance and interlace with the interior sensing elements in the interior portion, wherein:
         the interior sensing elements and the edge sensing elements each have widths that vary non-monotonically from a center of the interior and edge sensing elements along two substantially perpendicular directions on the sensor layout, and centroid; and
         the sensor determines a two-dimensional location for a touch overlapping the sensing elements using a weighting that is proportional to an overlap area of the sensor elements and their centroids;
   a controller; and
   a connector, the connector coupling the planar sensing area to the controller.

2. The sensor of claim 1, wherein at least one of the edge sensing elements includes a pass-through trace, the pass-through trace splitting the at least one edge sensing element and electrically couples at least one interior sensing element to the connector.

3. The sensor of claim 1, wherein the controller comprises a processor and a memory coupled to the processor.

4. The sensor of claim 1, wherein:
   the interior sensing elements comprise a first sensor element shape interlaced with a second sensor element shape;
   the edge sensor elements comprise one or more shapes that are different than the first sensor element shape and the second sensor element shape; and
   the interior sensor elements and the edge sensing elements are non-overlapping.

5. A capacitive touch sensor for determining a two-dimensional location of a user touch, comprising:
   a touch surface, the touch surface formed as a two-dimensional plane and including a sensor element layout, the sensor element layout comprising:
     an interior portion, an edge portion, and edges;
     interior sensing elements, the interior sensing elements being located in the interior portion; and
     edge sensing elements, the edge sensing elements being located at the edge portion, wherein:
       the interior sensing elements are arranged in the sensor layout such that at least half of the interior sensing elements do not extend beyond a predetermined distance from the edges; and
       the edge sensing elements are arranged to extend beyond the predetermined distance and interlace with the interior sensing elements in the interior portion, wherein:
         the interior sensing elements and the edge sensing elements each have widths that vary non-monotonically from a center of the interior and edge sensing elements along two substantially perpendicular directions on the sensor layout, and centroid; and
         the sensor determines a two-dimensional location for a touch overlapping the sensing elements using a weighting that is proportional to an overlap area of the sensor elements and their centroids;
   a controller; and
   a connector, the connector coupling the touch surface to the controller.

6. The sensor of claim 5, wherein:
   the interior sensing elements comprise a first sensor element shape interlaced with a second sensor element shape;
   the edge sensor elements comprise one or more shapes that are different than the first sensor element shape and the second sensor element shape; and
   the interior sensing elements and the edge sensor elements are non-overlapping.

7. The capacitive touch sensor of claim 5, wherein the predetermined distance is half of a diameter of a size of the user touch.

8. The capacitive touch sensor of claim 5, wherein the predetermined distance is between 1 mm to 9 mm.

9. The capacitive touch sensor of claim 5, wherein the connector comprises a plurality of coupling channels, each of the coupling channels coupling a single interior or edge sensing element to the touch controller.

10. The capacitive touch sensor of claim 5, wherein at least one of the edge sensing elements includes a pass-through trace, the pass-through trace splitting the at least one edge sensing element and electrically couples at least one interior sensing element to the connector.

11. A method of manufacturing a capacitive touch sensor having an improved response, the method comprising:
    dividing a touch area of the capacitive touch sensor into an interior area and an edge area, wherein the edge area comprises an area of the touch area that extends from edges of the touch area inwards by a predetermined distance, and the interior area is a remaining area of the touch area;
    arranging edge sensor elements in the edge area in a pattern that covers the edge area and extends into the interior area while maintaining an edge sensor element width that varies non-monotonically from a center of the edge sensing element along two substantially perpendicular directions; and
    arranging interior sensor elements in the interior area in a pattern of the touch surface that covers the interior area while maintaining an interior sensor element width that varies non-monotonically from a center of the interior sensing element along two substantially perpendicular directions such that at least half of the interior sensor elements do not extend into the edge area, the edge sensor elements interlacing with the interior sensor elements in the interior area such that a location of a touch overlapping the edge and interior sensor elements is determined using a weighting that is proportional to a touch overlap area of the edge and interior sensor elements and their centroids.

12. The method of claim 11, wherein the predetermined distance is half of a diameter of a size of the touch from a user.

13. The method of claim 11, wherein the predetermined distance is between 1 mm to 9 mm.

14. The method of claim 11, wherein:
arranging the interior sensing elements comprises interlacing a first sensor element shape with a second sensor element shape; and
arranging the edge sensing elements comprises interlacing the edge sensor elements with each other and selected interior sensing elements in one or more shapes that are different than the first sensor element shape and the second sensor element shape.

15. The method of claim 14, wherein arranging the interior sensing elements and the edge sensing elements further comprises arranging the interior and edge sensing elements so that the sensing elements do not overlap.

16. A capacitive touch sensor for determining a two-dimensional location of a user touch, comprising:
a touch surface, the touch surface formed as a two-dimensional plane and including a sensor element layout having a plurality of sensor elements, the sensor element layout comprising an interior portion, an edge portion, and edges, wherein:
the plurality of sensor elements have widths that vary non-monotonically from a center of the sensor elements along two substantially perpendicular directions on the sensor layout, and centroid, wherein the sensor determines a two-dimensional location for a touch overlapping the sensing elements using a weighting that is proportional to an overlap area of the sensor elements and their centroids; and
the edge portion is covered by an enclosure such that sensor elements that overlap the interior portion and edge portion are partially covered by the enclosure;
a controller; and
a connector, the connector coupling the touch surface to the controller.

17. The capacitive touch sensor of claim 16, wherein the two-dimensional location of a user touch is determined to be at a boundary between the edge portion and the interior portion when the user touch is sensed by sensor elements overlapping the interior portion and the edge portion covered by the enclosure.

18. The capacitive touch sensor of claim 16, wherein the enclosure comprises at least one of a bezel of an electronic device or non-insulative paint that does not obstructs the sensing of the touch surface covered by the enclosure.

* * * * *